US012511102B2

(12) United States Patent
Fujiwara et al.

(10) Patent No.: US 12,511,102 B2
(45) Date of Patent: Dec. 30, 2025

(54) MEMORY DEVICE AND METHOD FOR COMPUTING-IN-MEMORY (CIM)

(71) Applicant: TAIWAN SEMICONDUCTOR MANUFACTURING COMPANY, LTD., Hsinchu (TW)

(72) Inventors: Hidehiro Fujiwara, Hsinchu (TW); Haruki Mori, Hsinchu (TW); Wei-Chang Zhao, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 921 days.

(21) Appl. No.: 17/576,898

(22) Filed: Jan. 14, 2022

(65) Prior Publication Data

US 2023/0068645 A1    Mar. 2, 2023

Related U.S. Application Data

(60) Provisional application No. 63/237,662, filed on Aug. 27, 2021.

(51) Int. Cl.
*G06F 15/78* (2006.01)
*G06F 7/544* (2006.01)
*G06F 17/16* (2006.01)

(52) U.S. Cl.
CPC ........ *G06F 7/5443* (2013.01); *G06F 15/7821* (2013.01); *G06F 17/16* (2013.01)

(58) Field of Classification Search
CPC ...... G06G 17/16; G06F 15/7821; G06F 17/16
See application file for complete search history.

(56) References Cited

U.S. PATENT DOCUMENTS

2023/0086802 A1* 3/2023 Wadhwa .............. G06N 3/0464
    708/620
2023/0127502 A1* 4/2023 Lin ..................... G11C 11/4099
    365/185.2

FOREIGN PATENT DOCUMENTS

CN    111553472    8/2020
CN    112486901    3/2021
(Continued)

OTHER PUBLICATIONS

H. Jia et al., "15.1 A Programmable Neural-Network Inference Accelerator Based on Scalable In-Memory Computing," 2021 IEEE International Solid-State Circuits Conference (ISSCC), San Francisco, CA, USA, 2021, pp. 236-238 (Year: 2021).*
(Continued)

*Primary Examiner* — Matthew D Sandifer
(74) *Attorney, Agent, or Firm* — Hauptman Ham, LLP

(57) ABSTRACT

A memory device has a memory array including a memory segment to store weight data, a weight buffer coupled to the memory segment and configured to hold new weight data to be updated in the memory segment, a logic circuit, and a computation circuit coupled to an output of the logic circuit. The logic circuit further has a first input coupled to the memory segment by a bit line, and a second input configured to receive input data. The logic circuit is configured to generate, at the output, intermediate data corresponding to the input data and the weight data read from the memory segment through the bit line. The computation circuit is configured to, based on the intermediate data, generate output data corresponding to a computation performed on the input data and the weight data read from the at least one memory segment.

20 Claims, 17 Drawing Sheets

(56) References Cited

FOREIGN PATENT DOCUMENTS

| KR | 10-2000-0044551 | 7/2000 |
| KR | 10-2020-0131741 | 11/2020 |
| KR | 10-2021-0051363 | 6/2021 |
| TW | M614073 U | 7/2021 |

OTHER PUBLICATIONS

Yue, Jinshan et al., "A 2.75-to-75.9TOPS/W Computing-in-Memory NN Processor Supporting Set-Associate Block-Wise Zero Skipping and Ping-Pong CIM with Simultaneous Computation and Weight Updating", ISSCC/Session15/Compute-In-Memory Processors For Deep Neural Networks/15.2, Feb. 17, 2021, pp. 238-239.

\* cited by examiner

MEMORY DEVICE AND METHOD FOR COMPUTING-IN-MEMORY (CIM)

PRIORITY CLAIM

The present application claims the priority of U.S. Provisional Application No. 63/237,662, filed Aug. 27, 2021, which is incorporated herein by reference in its entirety.

BACKGROUND

Recent developments in the field of artificial intelligence have resulted in various products and/or applications, including, but not limited to, speech recognition, image processing, machine learning, natural language processing, or the like. Such products and/or applications often use neural networks to process large amounts of data for learning, training, cognitive computing, or the like.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
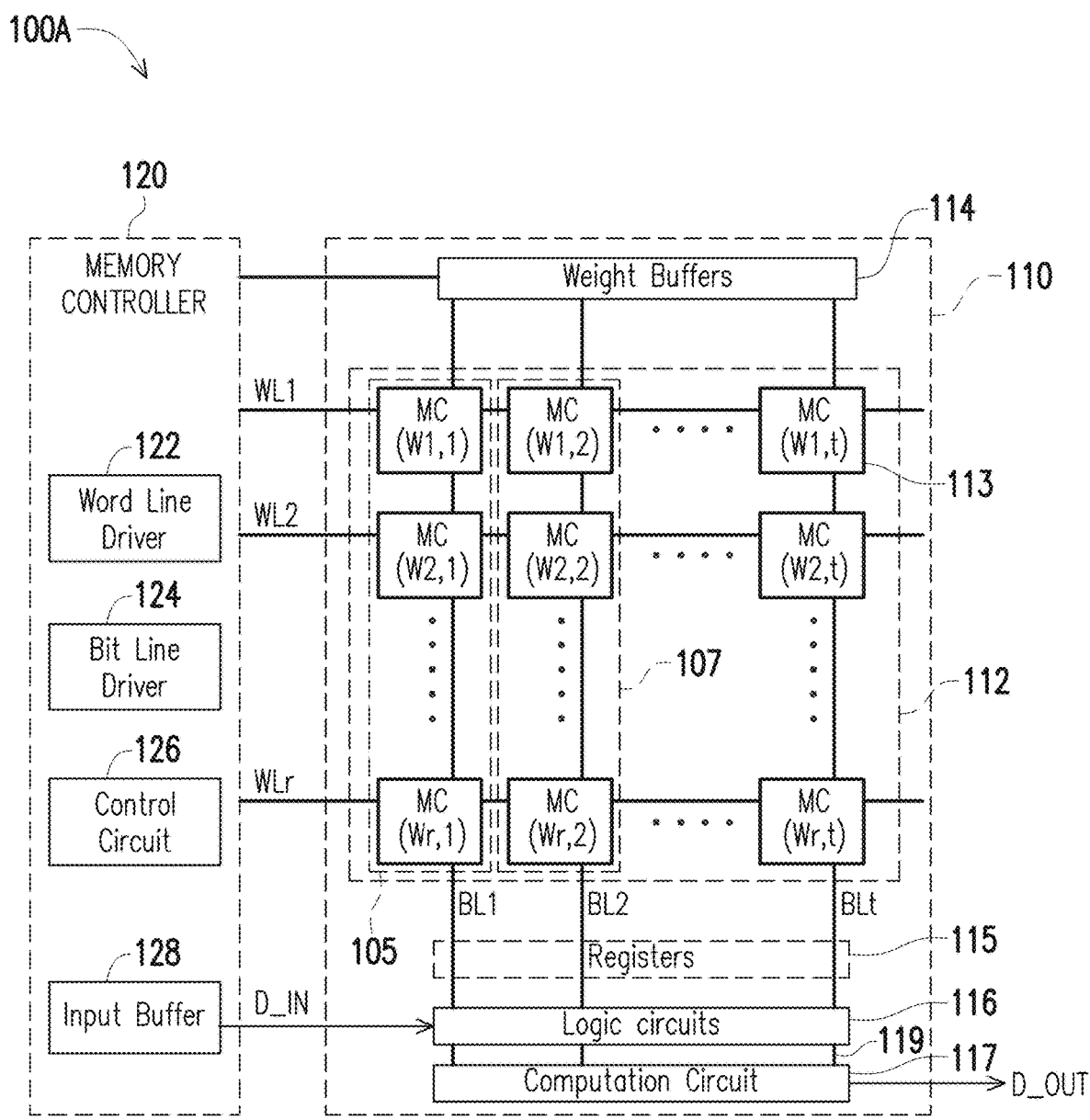
FIG. 1A is a schematic diagram of a memory device, in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Memory devices configured to perform computing-in-memory (CIM) operations (also referred to herein as CIM memory devices) are usable neural network applications, as well as other applications. A CIM memory device includes a memory array configured to store weight data to be used, together with input data, in one or more CIM operations. After one or more CIM operations, the weight data in the memory array are updated for further CIM operations.

In some embodiments, one or more weight buffers are included in the same memory macro that contains the memory array storing the weight data. The one or more weight buffers are coupled to corresponding one or more memory segments in the memory array. In at least one embodiment, weight data in one or more memory segments are updated from the corresponding one or more weight buffers, while other memory segments are being accessed to obtain weight data for a CIM operation. In at least one embodiment, weight data in one or more memory cells of a memory segment are updated from the corresponding weight buffer, while weight data in other memory cells of the same memory segment are used for a CIM operation. As a result, in one or more embodiments, it is possible to perform weight data updating and CIM operations at the same time. This is different from other approaches in which the whole memory array is accessed for a CIM operation and, therefore, CIM operations are stopped whenever weight data updating is performed. Because weight data updating and CIM operations are not performed at the same time in accordance with other approaches, such approaches potentially suffer from one or more issues, including, but not limited to, lowered performance, increased processing time, increased power consumption, or the like. Such issues are avoidable by CIM memory devices in accordance with some embodiments where it is possible to perform weight data updating and CIM operations at the same time. In at least one embodiment, because one or more weight buffers are included in the same memory macro as the memory array storing weight data, it is possible to eliminate, or at least reduce the size of, a weight buffer external to the memory macro. This is another difference from other approaches where external weight buffers are needed. Compared to other approaches, in at least one embodiment, CIM memory devices with no external weight buffers, or with size-reduced external weight buffers, provide one or more advantages including, but not limited to, reduced chip area, lowered manufacturing cost, improved performance, or the like.

FIG. 1A is a schematic diagram of a memory device 100A, in accordance with some embodiments. A memory device is a type of an integrated circuit (IC) device. In at least one embodiment, a memory device is an individual IC device. In some embodiments, a memory device is included as a part of a larger IC device which comprises circuitry other than the memory device for other functionalities.

The memory device 100A comprises a memory macro 110 and a memory controller 120. The memory macro 110 comprises a memory array 112, one or more weight buffers 114, one or more registers 115, one or more logic circuits 116, and computation circuit 117. The memory controller 120 comprises a word line driver 122, a bit line driver 124, a control circuit 126, and an input buffer 128. In some embodiments, one or more elements of the memory controller 120 are included in the memory macro 110, and/or one or more elements (except the memory array 112) of the memory macro 110 are included in the memory controller 120.

A macro has a reusable configuration and is usable in various types or designs of IC devices. In some embodiments, the macro is understood in the context of an analogy to the architectural hierarchy of modular programming in which subroutines/procedures are called by a main program (or by other subroutines) to carry out a given computational function. In this context, an IC device uses the macro to perform one or more given functions. Accordingly, in this context and in terms of architectural hierarchy, the IC device is analogous to the main program and the macro is analogous to subroutines/procedures. In some embodiments, the macro is a soft macro. In some embodiments, the macro is a hard macro. In some embodiments, the macro is a soft macro which is described digitally in register-transfer level (RTL) code. In some embodiments, synthesis, placement and routing have yet to have been performed on the macro such that the soft macro can be synthesized, placed and routed for a variety of process nodes. In some embodiments, the macro is a hard macro which is described digitally in a binary file format (e.g., Graphic Database System II (GDSII) stream format), where the binary file format represents planar geometric shapes, text labels, other information and the like of one or more layout-diagrams of the macro in hierarchical form. In some embodiments, synthesis, placement and routing have been performed on the macro such that the hard macro is specific to a particular process node.

A memory macro is a macro comprising memory cells which are addressable to permit data to be written to or read from the memory cells. In some embodiments, a memory macro further comprises circuitry configured to provide access to the memory cells and/or to perform a further function associated with the memory cells. For example, the memory macro 110 comprises memory cells MC as described herein, and the weight buffers 114, registers 115, logic circuits 116 and computation circuit 117 form circuitry configured to provide a CIM function associated with the memory cells MC. In at least one embodiment, a memory macro configured to provide a CIM function is referred to as a CIM macro. The described macro configuration is an example. Other configurations are within the scopes of various embodiments.

The memory cells MC of the memory macro 110 are arranged in a plurality of columns and rows of the memory array 112. The memory controller 120 is electrically coupled to the memory cells MC and configured to control operations of the memory cells MC including, but not limited to, a read operation, a write operation, or the like.

The memory array 112 further comprises a plurality of word lines (also referred to as "address lines") WL1 to WLr extending along the rows, and a plurality of bit lines (also referred to as "data lines") BL1 to BLt extending along the columns of the memory cells MC, where r and t are natural numbers. Each of the memory cells MC is electrically coupled to the memory controller 120 by at least one of the word lines, and at least one of the bit lines. In some example operations, word lines are configured for transmitting addresses of the memory cells MC to be read from, or for transmitting addresses of the memory cells MC to be written to, or the like. In at least one embodiment, a set of word lines is configured to perform as both read word lines and write word lines. Examples of bit lines include read bit lines for transmitting data read from the memory cells MC indicated by corresponding word lines, write bit lines for transmitting data to be written to the memory cells MC indicated by corresponding word lines, or the like. In at least one embodiment, a set of bit lines is configured to perform as both read bit lines and write bit lines. The word lines are commonly referred to herein as WL, and the bit lines are commonly referred to herein as BL. Various numbers of word lines and/or bit lines in the memory array 112 are within the scope of various embodiments. Example memory types of the memory cells MC include, but are not limited to, static random-access memory (SRAM), resistive RAM (RRAM), magnetoresistive RAM (MRAM), phase change RAM (PCRAM), spin transfer torque RAM (STTRAM), floating-gate metal-oxide-semiconductor field-effect transistors (FG-MOS), spintronics, or the like. In one or more example embodiments described herein, the memory cells MC include SRAM memory cells.

In the example configuration in FIG. 1A, the memory cells MC are single-port memory cells. In some embodiments, a port of a memory cell is represented by a set of a word line WL and a bit line BL (referred to herein as a WL/BL set) which are configured to provide access to the memory cell in a read operation (i.e., read access) and/or in a write operation (i.e., write access). A single-port memory cell has one WL/BL set which is configured for both read access and write access, but not at the same time. A multi-port memory cell has several WL/BL sets each of which is configured for read access only, or for write access only, or for both read access and write access. Examples of single-port memory cells are described with respect to FIGS. 1A, 4E. Examples of multi-port memory cells are described with respect to FIGS. 1B, 5A, 5B, 5C.

The memory array 112 comprises a plurality of memory segments. In some embodiments, a memory segment comprises a memory row, a memory column, a memory bank, or the like. A memory row comprises a plurality of memory cells coupled to the same word line WL. A memory column (also referred to as "memory string") comprises a plurality of memory cells coupled to the same bit line BL. A memory bank comprises more than one memory rows and/or more than one memory columns. In at least one embodiment, a memory bank comprises a section of the memory array 112 with multiple memory rows and multiple memory columns. In some embodiments, a memory segment comprises multiple memory banks. In an example, a first memory segment 105 includes a memory column of memory cells MC coupled to the bit line BL1, a second memory segment 107 includes a memory column of memory cells MC coupled to the bit line BL2, or the like. Other manners of dividing the memory array 112 into a plurality of memory segments are within the scopes of various embodiments.

Each of the memory cells MC is configured to store a piece of weight data to be used in a CIM operation. In one or more example embodiments described herein, the memory cells MC are single-bit memory cells, i.e., each memory cell is configured to store a bit of weight data. This is an example, and multi-bit memory cells, each of which is configured to store more than one bit of weight data, are within the scopes of various embodiments. In some embodiments, a single-bit memory cell is also referred to as a bitcell. For example, the memory cell 113 coupled to the word line WL1 and the bit line BLt is configured to store a piece W1,t of the weight data. A combination of multiple pieces of weight data stored in multiple memory cells constitutes a weight value to be used in a CIM operation. For simplicity, a piece of weight data stored in a memory cell MC, multiple pieces of weight data stored in multiple memory cells MC, or all pieces of weight data stored in all memory cells MC of the memory array 112 are referred to herein as weight data.

The weight buffers 114 are coupled to the memory array 112, and configured to temporarily hold new weight data to be updated in the memory array 112. In some embodiments as described herein, each memory segment is coupled to a corresponding weight buffer. In one or more embodiments as described herein, a common weight buffer is coupled to several memory segments. The weight buffers 114 are coupled to the memory cells MC in the memory array 112 via the bit lines BL. In a weight data updating operation, the new weight data are written into one or more memory cells MC from the weight buffers 114 and via the corresponding bit lines BL. As schematically illustrated in FIG. 1A, the weight buffers 114 are coupled to the memory controller 120 to receive the new weight data and/or control signals that specify when and/or in which memory cells MC the new weight data are to be updated. In at least one embodiment, the new weight data are received from external circuitry outside the memory device 100A, for example, a processor as described herein. The new weight data are received through one or more input/output (I/O) circuits (not shown) of the memory controller 120, and are forwarded to the weight buffers 114. Example weight buffers include, but are not limited to, registers, memory cells, or other circuit elements configured for data storage.

The registers 115 have inputs coupled to the bit lines BL to receive the weight data read out from one or more of the memory cells MC. The registers 115 are configured to latch the weight data received from the bit lines BL, and supply the latched weight data to the logic circuits 116 via outputs of the registers 115. As a result, while the latched weight data are being used in a CIM operation at the logic circuits 116 and/or the computation circuit 117 as described herein, the bit lines BL are usable in a write operation to update one or more memory cells MC with new weight data from the weight buffers 114. The simultaneous performance of weight data updating and CIM operations provides one or more advantages, as described herein. Examples of the registers 115 include flip-flops, latches, or the like. In some embodiments, each register among the registers 115 is coupled to a bit line among the bit lines BL of the memory array 112. In one or more embodiments, a register, e.g., a multi-bit register, among the registers 115 is coupled to multiple bit lines among the bit lines BL of the memory array 112.

Besides the described simultaneous performance of weight data updating and CIM operations for different memory cells in a memory segment, it is also possible to simultaneously perform weight data updating and CIM operations in different memory segments, in accordance with some embodiments. For example, the weight data in the first memory segment 105 are updated by new weight data supplied from a corresponding weight buffer among the weight buffers 114 over the bit line BL1, while, at the same time, the weight data read out from the second memory segment 107 over a different bit line BL2 are being used in a CIM operation. The presence of different data on different bit line BLs does not affect or disturb the simultaneously performed weight data updating and CIM operations, in at least one embodiment.

The logic circuits 116 have inputs coupled to the outputs of the registers 115. The logic circuits 116 have further inputs coupled to receive input data D_IN to be used with the weight data in a CIM operation. In the example configuration in FIG. 1A, the input data D_IN are supplied from the input buffer 128 in the memory controller 120. In one or more embodiments, the input data D_IN are output data supplied from another memory macro (not shown) of the memory device 100A. In some embodiments, the input data D_IN are serially supplied to the logic circuits 116 in the form of a stream of bits, as described herein. The logic circuits 116 are configured to generate, at outputs thereof, intermediate data 119 corresponding to the input data D_IN and the weight data read from one or more of the memory cells MC. Examples of the logic circuits 116 include, but are not limited to, NOR gates, AND gates, any other logic gates, combinations of logic gates, or the like.

The computation circuit 117 is coupled to the outputs of the logic circuits 116, and is configured to, based on the intermediate data 119 output from the logic circuits 116, generate output data D_OUT corresponding to a CIM operation performed on the input data D_IN and the weight data read from one or more of the memory cells MC. Examples of CIM operations include, but are not limited to, mathematical operations, logical operations, combination thereof, or the like. In some embodiments, the computation circuit 117 is configured to combine multiple intermediate data 119 output by multiple logic circuits 116 into the output data D_OUT. In at least one embodiment, the computation circuit 117 comprises a Multiply Accumulate (MAC) circuit, and the CIM operation comprises a multiplication of one or more multibit weight values with one or more multibit input data values. Further computation circuits configured to perform CIM operations other than a multiplication are within the scopes of various embodiments. In some embodiments, the output data D_OUT are supplied, as input data, to another memory macro (not shown) of the memory device 100A. In one or more embodiments, the output data D_OUT are output, through one or more I/O circuits (not shown) of the memory controller 120, to external circuitry outside the memory device 100A, for example, a processor as described herein.

In the example configuration in FIG. 1A, the controller 120 comprises the word line driver 122, the bit line driver 124, the control circuit 126, and the input buffer 128. In at least one embodiment, the controller 120 further includes one or more clock generators for providing clock signals for various components of the memory device 100A, one or more input/output (I/O) circuits for data exchange with external devices, and/or one or more controllers for controlling various operations in the memory device 100A.

The word line driver 122 is coupled to the memory array 112 via the word lines WL. The word line driver 122 is configured to decode a row address of the memory cell MC selected to be accessed in a read operation or a write operation. The word line driver 122 is configured to supply a voltage to the selected word line WL corresponding to the decoded row address, and a different voltage to the other, unselected word lines WL.

The bit line driver 124 is coupled to the memory array 112 via the bit lines BL. The bit line driver 124 is configured to decode a column address of the memory cell MC selected to be accessed in a read operation or a write operation. The bit line driver 124 is configured to supply a voltage to the selected bit line BL corresponding to the decoded column address, and a different voltage to the other, unselected bit lines BL.

The control circuit 126 is coupled to one or more of the weight buffers 114, registers 115, logic circuits 116, computation circuit 117, word line driver 122, bit line driver 124, input buffer 128 to coordinate operations of these circuits, drivers and/or buffers in the overall operation of the memory device 100A. For example, the control circuit 126 is configured to generate various control signals for controlling operations of one or more of the weight buffers 114, registers 115, logic circuits 116, computation circuit 117, word line driver 122, bit line driver 124, input buffer 128.

The input buffer 128 is configured to receive the input data from external circuitry outside the memory device 100A, for example, a processor as described herein. The input data are received through one or more I/O circuits (not shown) of the memory controller 120, and are forwarded via the input buffer 128 to the logic circuits 116. Example input buffers include, but are not limited to, registers, memory cells, or other circuit elements configured for data storage.

In at least one embodiment, CIM memory devices, such as the memory device 100A, are advantageous over other approaches, where data are moved back and forth between the memory and a processor, because such back-and-forth data movement, which is a bottleneck to both performance and energy efficiency, is avoidable. Examples CIM applications include, but are not limited to, artificial intelligence, image recognition, neural network for machine learning, or the like. In some embodiments, the memory device 100A makes it possible to simultaneously perform weight data updating and CIM operations, in one or more embodiments. Further, the inclusion of the weight buffers 114 in the memory macro 110 makes it possible to eliminate, or at least reduce the size of, an external weight buffer outside the memory macro 110. As a result, in at least one embodiment, it is possible to achieve one or more advantages including, but not limited to, reduced processing time, reduced power consumption, reduced chip area, lowered manufacturing cost, improved performance, or the like.

Figure 1B:
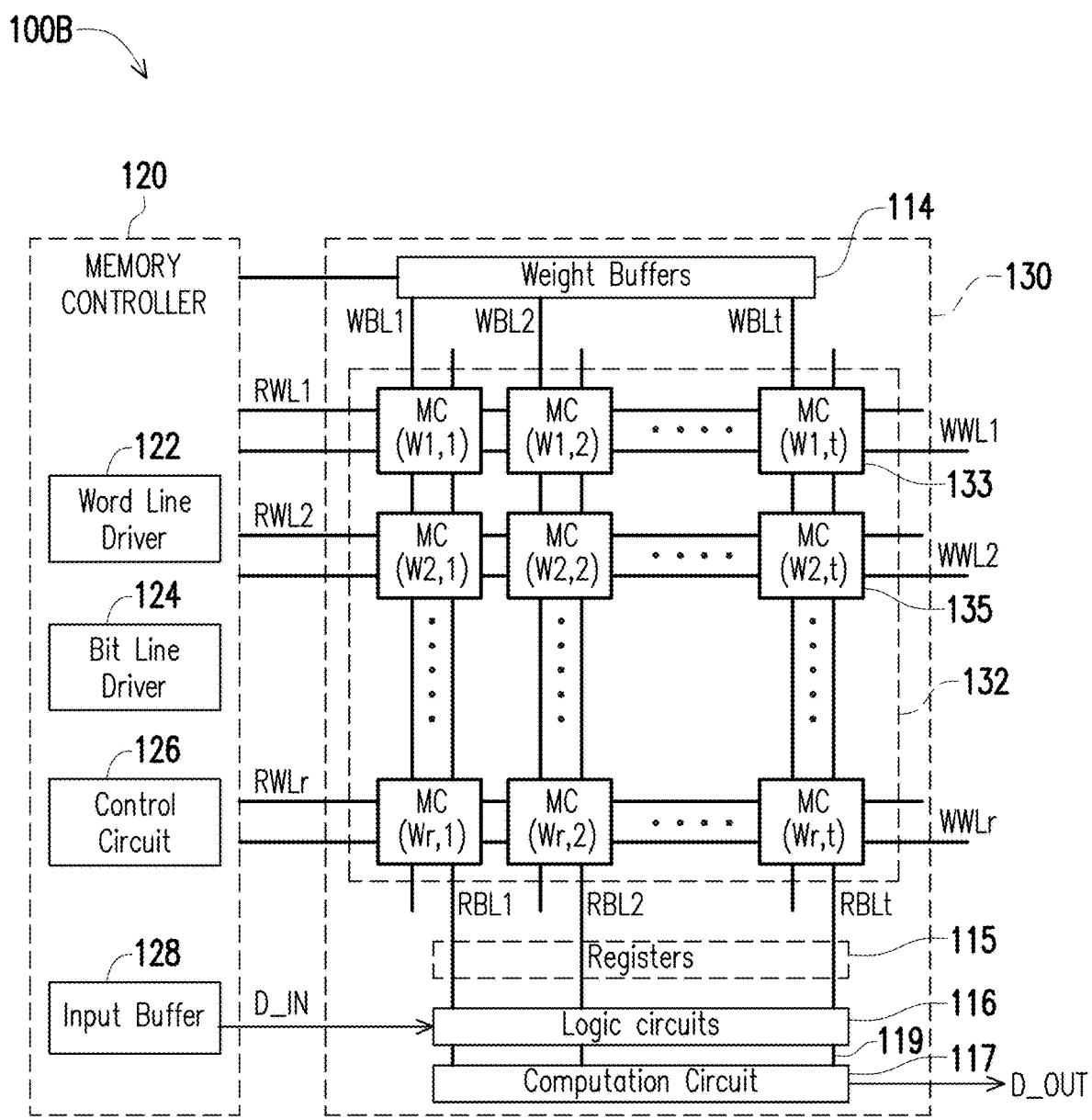
FIG. 1B is a schematic diagram of a memory device, in accordance with some embodiments.

FIG. 1B is a schematic diagram of a memory device 100B, in accordance with some embodiments. Components in FIG. 1B having corresponding components in FIG. 1A are designated by the same reference numerals as in FIG. 1A.

A difference between the memory device 100A and the memory device 100B is that the memory device 100A comprise single-port memory cells, whereas the memory device 100B comprises multi-port memory cells. Specifically, the memory device 100B comprises a memory macro 130 having a memory array 132 in which multi-port memory cells MC are arranged in a plurality of rows and columns. A plurality of read word lines RWL1 to RWLr (commonly referred to as "RWL") and a plurality of write word lines WWL1 to WWLr (commonly referred to as "WWL") extend along the rows. A plurality of read bit lines RBL1 to RBLt (commonly referred to as "RBL") and a plurality of write bit lines WBL1 to WBLt (commonly referred to as "WBL") extend along the columns. Each memory cell MC is coupled to a pair of a read word line RWL and a read bit line RBL, and to another pair of a write word line WWL and a write bit line WBL. For example, the memory cell 133 is coupled to a pair of a read word line RWL1 and a read bit line RBLt, and to another pair of a write word line WWL1 and a write bit line WBLt. For each memory cell MC, the RWL/RBL pair presents a read port, and the WWL/WBL pair presents a write port. In some embodiments, a set of word lines WL is configured as both write word lines and read word lines. The weight buffers 114 are coupled to the memory array 132 via the write bit lines WBL. In the example configuration in FIG. 1B, the registers 115 are omitted and the logic circuits 116 are coupled to the read bit lines RBL. In at least one embodiment, the registers 115 are included in the memory device 100B and are coupled between the read bit lines RBL and the logic circuits 116 in a manner similar to the memory device 100A. In one or more embodiments, the registers 115, when included in the memory device 100B, make it possible to hold the latched weight data at the inputs of the logic circuits 116 for an extended period of time, which may be difficult to achieve if the registers 115 are not included.

In at least one embodiment, the multi-port memory cells of the memory array 132 make it possible to simultaneously perform weight data updating and CIM operations. For example, when the memory cell 133 is accessed in a read operation to readout the corresponding piece W1,t of weight data for a CIM operation, the read piece W1,t of weight data is supplied through the corresponding read bit line RBLt to the logic circuits 116. Simultaneously, weight data updating is performed for any other memory cell in the same column or memory string. For example, the piece of weight data in a memory cell 135 is updatable at the same time as the CIM operation performed for the memory cell 133, by a new piece of weight data supplied from the weight buffers 114 through the corresponding write bit line WBLt. The described CIM operation and weight data updating are carried over two different bit lines, i.e., the read bit line RBLt and the write bit line WBLt, without affecting or otherwise disturbing each other. As a result, it is possible to simultaneously perform weight data updating and CIM operations, in one or more embodiments. In at least one embodiment, one or more advantages described herein with respect to the memory device 100A are achievable by the memory device 100B.

Figure 2A:
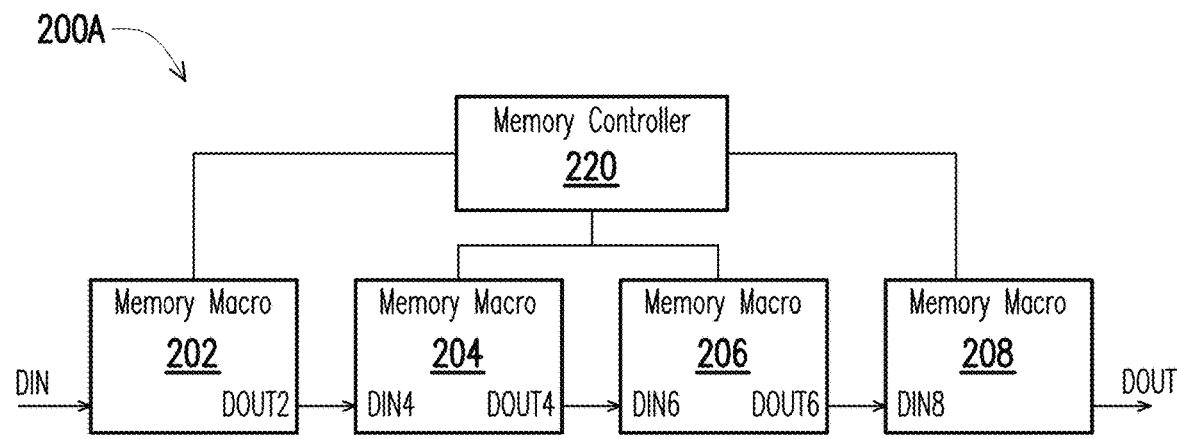
FIG. 2A is a schematic diagram of a memory device, in accordance with some embodiments.

FIG. 2A is a schematic diagram of a memory device 200A, in accordance with some embodiments.

The memory device 200A comprises memory macros 202, 204, 206, 208 and memory controller 220. In some embodiments, one or more of the memory macros 202, 204, 206, 208 correspond to one or more of the memory macros 110, 130, and/or the memory controller 220 corresponds to the memory controller 120. In the example configuration in FIG. 2A, the memory controller 220 is a common memory controller for the memory macros 202, 204, 206, 208. In at least one embodiment, at least one of the memory macros 202, 204, 206, 208 has its own memory controller. The number of four memory macros in the memory device 200A is an example. Other configurations are within the scopes of various embodiments.

The memory macros 202, 204, 206, 208 are coupled to each other in sequence, with output data of a preceding memory macro being input data for a subsequent memory macro. For example, input data DIN are input into the memory macro 202. The memory macro 202 performs one or more CIM operations based on the input data DIN and weight data stored in the memory macro 202, and generates output data DOUT2 as results of the CIM operations. The output data DOUT2 are supplied as input data DIN4 of the memory macro 204. The memory macro 204 performs one or more CIM operations based on the input data DIN4 and weight data stored in the memory macro 204, and generates output data DOUT4 as results of the CIM operations. The output data DOUT4 are supplied as input data DIN6 of the memory macro 206. The memory macro 206 performs one or more CIM operations based on the input data DIN6 and weight data stored in the memory macro 206, and generates output data DOUT6 as results of the CIM operations. The output data DOUT6 are supplied as input data DIN8 of the memory macro 208. The memory macro 208 performs one or more CIM operations based on the input data DIN8 and weight data stored in the memory macro 208, and generates output data DOUT as results of the CIM operations. One or more of the input data DIN, DIN4, DIN6, DIN8 correspond to the input data D_IN described with respect to FIGS. 1A-1B, and/or one or more of the output data DOUT2, DOUT4, DOUT6, DOUT correspond to the output data D_OUT described with respect to FIGS. 1A-1B. In at least one embodiment, the described configuration of the memory macros 202, 204, 206, 208 implements a neural network. In at least one embodiment, one or more advantages described herein are achievable by the memory device 200A.

Figure 2B:
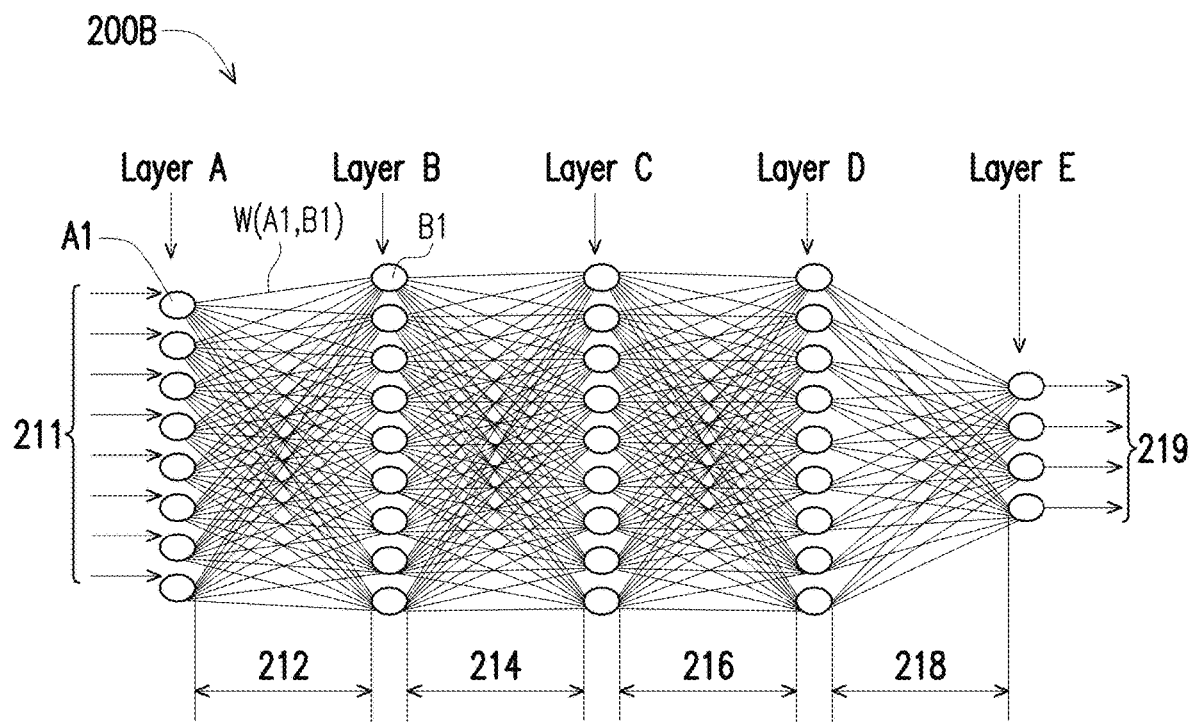
FIG. 2B is a schematic diagram of a neural network, in accordance with some embodiments.

FIG. 2B is a schematic diagram of a neural network 200B, in accordance with some embodiments.

The neural network 200B comprises a plurality of layers A-E each comprising a plurality of nodes (or neurons). The nodes in successive layers of the neural network 200B are connected with each other by a matrix or array of connections. For example, the nodes in layers A and B are connected with each other by connections in a matrix 212, the nodes in layers B and C are connected with each other by connections in a matrix 214, the nodes in layers C and D are connected with each other by connections in a matrix 216, and the nodes in layers D and E are connected with each other by connections in a matrix 218. Layer A is an input layer configured to receive input data 211. The input data 211 propagate through the neural network 200B, from one layer to the next layer via the corresponding matrix of connections between the layers. As the data propagate through the neural network 200B, the data undergo one or more computations, and are output as output data 219 from layer E which is an output layer of the neural network 200B. Layers B, C, D between input layer A and output layer E are sometimes referred to as hidden or intermediate layers. The number of layers, number of matrices of connections, and number of nodes in each layer in FIG. 2B are examples. Other configurations are within the scopes of various embodiments. For example, in at least one embodiment, the neural network 200B includes no hidden layer, and has an input layer connected by one matrix of connections to an output layer. In one or more embodiments, the neural network 200B has one, two, or more than three hidden layers.

In some embodiments, the matrices 212, 214, 216, 218 are correspondingly implemented by the memory macros 202, 204, 206, 208, the input data 211 correspond to the input data DIN, and the output data 219 correspond to the output data DOUT. Specifically, in the matrix 212, a connection between a node in layer A and another node in layer B has a corresponding weight. For example, a connection between node A1 and node B1 has a weight W(A1,B1) which corresponds to a weight value stored in the memory array of the memory macro 202. The memory macros 204, 206, 208 are configured in a similar manner. The weight data in one or more of the memory macros 202, 204, 206, 208 are updated, e.g., by a processor and through the memory controller 220, as machine learning is performed using the neural network 200B. One or more advantages described herein are achievable in the neural network 200B implemented in whole or in part by one or more memory macros and/or memory devices in accordance with some embodiments.

Figure 2C:
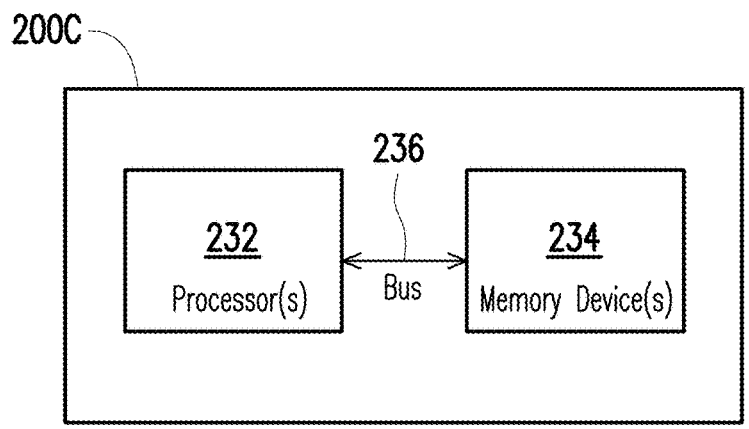
FIG. 2C is a schematic diagram of an integrated circuit (IC) device, in accordance with some embodiments.

FIG. 2C is a schematic diagram of an integrated circuit (IC) device 200C, in accordance with some embodiments.

The IC device 200C comprises one or more hardware processors 232, one or more memory devices 234 coupled to the processors 232 by one or more buses 236. In some embodiments, the IC device 200C comprises one or more further circuits including, but not limited to, cellular transceiver, global positioning system (GPS) receiver, network interface circuitry for one or more of Wi-Fi, USB, Bluetooth, or the like. Examples of the processors 232 include, but are not limited to, a central processing unit (CPU), a multi-core CPU, a neural processing unit (NPU), a graphics processing unit (GPU), a digital signal processor (DSP), a field-programmable gate array (FPGA), an application-specific integrated circuit (ASIC), other programmable logic devices, a multimedia processor, an image signal processors (ISP), or the like. Examples of the memory devices 234 include one or more memory devices and/or memory macros described herein. In at least one embodiment, each of the processors 232 is coupled to a corresponding memory device among the memory devices 234.

Because the one or more of the memory devices 234 are CIM memory devices, various computations are performed in the memory devices which reduces the computing workload of the corresponding processor, reduces memory access time, and improves performance. In at least one embodiment, the IC device 200C is a system-on-a-chip (SOC). In at least one embodiment, one or more advantages described herein are achievable by the IC device 200C.

Figure 3:
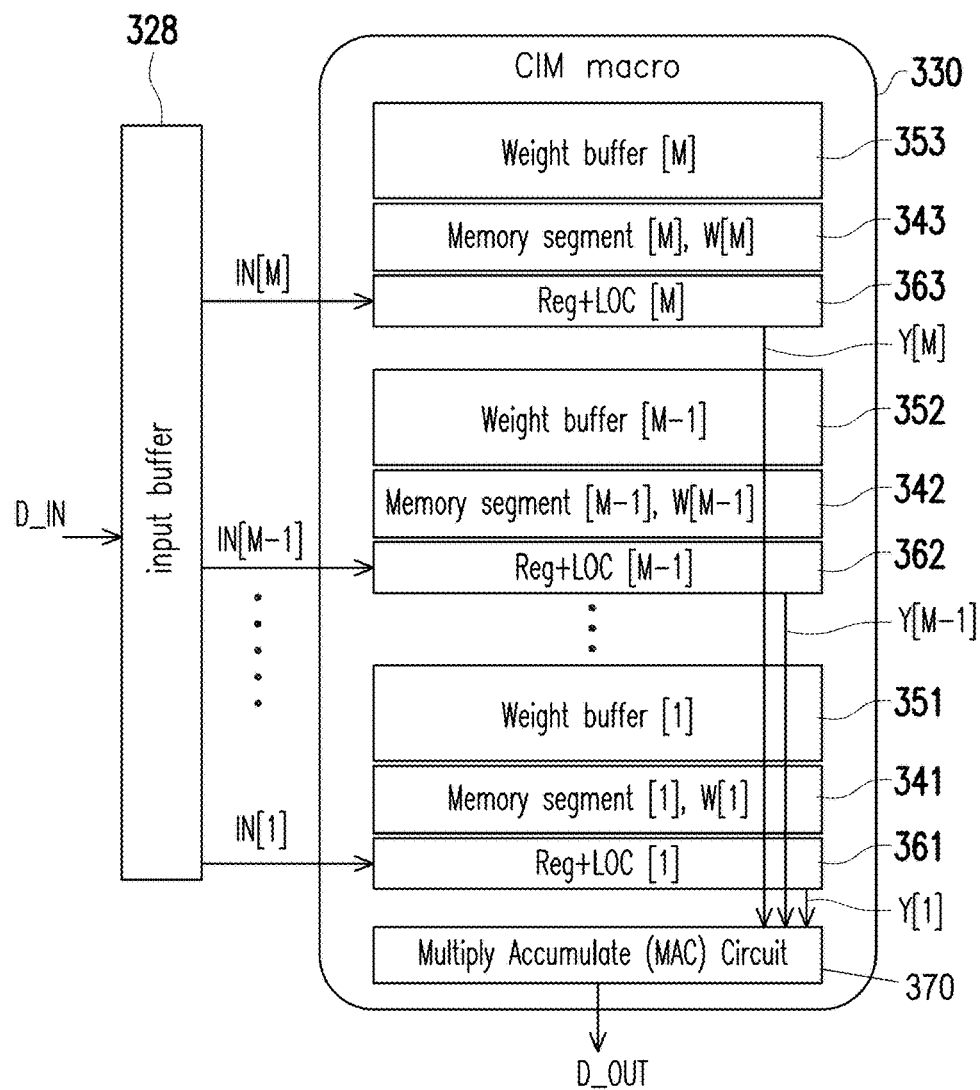
FIG. 3 is a schematic diagram of a section of a memory device, in accordance with some embodiments.

FIG. 3 is a schematic diagram of a section of a memory device 300, in accordance with some embodiments. In at least one embodiment, the memory device 300 corresponds to at least one of the memory devices 100A, 100B. As illustrated in FIG. 3, the memory device 300 comprises at least a memory macro 330 and an input buffer 328. Other components of the memory device 300 are omitted for simplicity.

In some embodiments, the memory macro 330 corresponds to at least one of memory macros 110, 130. In the example configuration in FIG. 3, the memory macro 330 is configured for CIM operations and is referred to as a CIM macro. The memory macro 330 comprises M memory segments 341, 342, 343, M weight buffers 351, 352, 353, M register and logic circuits (designed in FIG. 3 with the label "Reg+LOC") 361, 362, 363, where M is a natural number. Each of the M memory segments 341, 342, 343 comprises a memory row, a memory column, or at least one memory bank in a memory array of the memory macro 330. In some embodiments, the memory array of the memory macro 330 corresponds to at least one of the memory arrays 112, 132. Each of the memory segments 341, 342, 343 is configured to store corresponding weight data W[1], . . . W[M-1], W[M]. Each of the memory segments 341, 342, 343 is coupled to a corresponding weight buffer among the weight buffers 351, 352, 353, and a corresponding Reg+LOC circuit among the Reg+LOC circuits 361, 362, 363. In some embodiments, the weight buffers 351, 352, 353 correspond to one or more of the weight buffers 114. The weight buffers 351, 352, 353 are configured to provide new weight data to update the weight data stored in the corresponding memory segments 341, 342, 343. In some embodiments, each of the Reg+LOC circuits 361, 362, 363 includes a register corresponding to one or more of the registers 115, and a logic circuit corresponding to one or more of the logic circuits 116. The memory macro 330 further comprises a MAC circuit 370 coupled to outputs of the Reg+LOC circuits 361, 362, 363. In some embodiments, the MAC circuit 370 corresponds to the computation circuit 117.

The input buffer 328 is outside the memory macro 330. In some embodiments, the input buffer 328 corresponds to the input buffer 128. The input buffer 328 is configured to supply the input data D_IN, as a plurality of input data segments IN[1], ... IN[M-1], IN[M] to the corresponding Reg+LOC circuits 361, 362, 363. The Reg+LOC circuits 361, 362, 363 are configured to generate intermediate data Y[1], ... Y[M-1], Y[M] corresponding to the input data segments IN[1], ... IN[M-1], IN[M] and the weight data W[1], ... W[M-1], W[M] read from the memory segments 341, 342, 343. The intermediate data Y[1], ... Y[M-1], Y[M] are supplied to the MAC circuit 370 which is configured to perform further mathematical and/or logical operations to combine the intermediate data Y[1], ... Y[M-1], Y[M] into output data D_OUT. In some embodiments, the MAC circuit 370 together with the logic circuits in the Reg+LOC circuits 361, 362, 363 are configured to perform a multiplication of a multibit weight value represented by one or more of the weight data W[1], ... W[M-1], W[M] with a multibit input data value represented by one or more of the input data segments IN[1], ... IN[M-1], IN[M]. In at least one embodiment, registers are omitted from the Reg+LOC circuits 361, 362, 363.

In some embodiments, the weight data in one or more of the memory segments 341, 342, 343 are updated by new weight data supplied from the corresponding weight buffer, while the weight data read out from another memory segment are being used in a CIM operation. For example, in a manner similar to FIG. 1A, new weight data are supplied over a first bit line to update the memory segments 343, whereas the weight data W[M-1] are read out from the memory segment 342 for CIM operations over a second, different bit line. The presence of different data on different bit lines does not affect or disturb the simultaneously performed weight data updating and CIM operations, in at least one embodiment. In at least one embodiment, one or more advantages described herein are achievable by the memory macro 330.

Figure 4A:
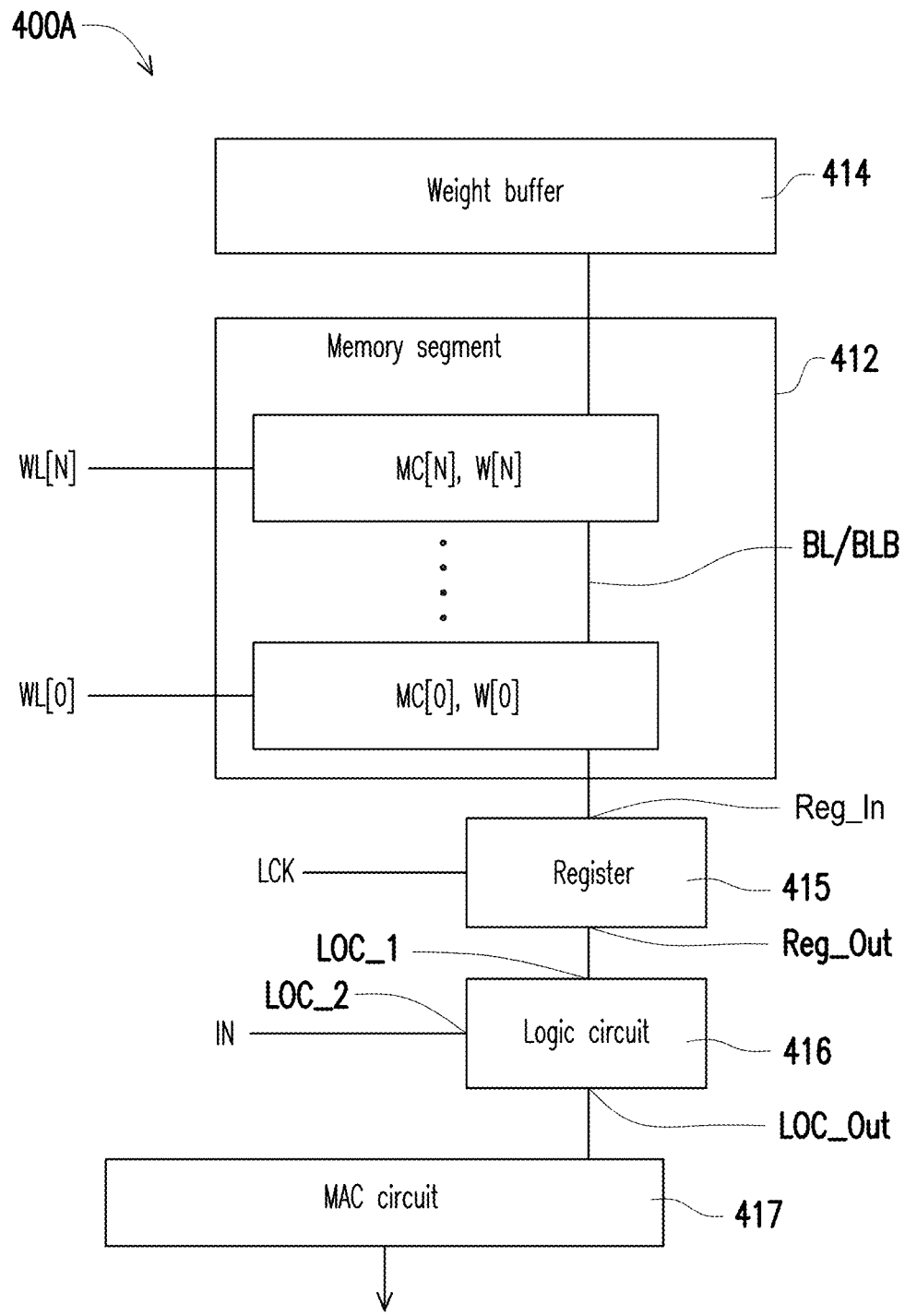
FIG. 4A is a schematic diagram of a section corresponding to a memory segment of a memory device, in accordance with some embodiments.

FIG. 4A is a schematic diagram of a section corresponding to a memory segment of a memory device 400A, in accordance with some embodiments. In some embodiments, the memory device 400A corresponds to at least one of the memory devices 100A, 300.

In the section shown in FIG. 4A, the memory device 400A comprises a memory segment 412, a weight buffer 414, a register 415, a logic circuit 416, and a MAC circuit 417. In some embodiments, the memory segment 412 is part of a memory array of the memory device 400A. In some embodiments, the memory segment 412 corresponds to at least one of the memory segments 341, 342, 343, the weight buffer 414 corresponds to at least one of the weight buffers 351, 352, 353, the register 415 and the logic circuit 416 correspond to at least one of the Reg+LOC circuits 361, 362, 363, and the MAC circuit 417 corresponds to the MAC circuit 370.

In the example configuration in FIG. 4A, the memory segment 412 is a memory column. The description herein with respect to the configuration and operation of the memory segment 412 being a memory column is applicable to other types of memory segments. The memory segment 412 comprises a plurality of memory cells MC[0] ... MC[N] correspondingly storing weight data W[0] ... W[N]. The memory cells MC[0] ... MC[N] are coupled to a pair of a bit line BL and a complementary bit line BLB. For simplicity, the bit line BL is described herein and the description with respect to the bit line BL is applicable to the complementary bit line BLB. The memory cells MC[0] ... MC[N] are single-port memory cells configured to use the bit line BL in both a read operation and a write operation. The memory cells MC[0] ... MC[N] are coupled to corresponding word lines WL[0] ... WL[N] to be accessed via the corresponding word lines in a read operation or a write operation. The bit line BL is coupled to the weight buffer 414 to receive new weight data to be updated in one of the memory cells MC[0] ... MC[N] in a write operation. The bit line BL is further coupled to an input Reg_In of the register 415 to output weight data in one of the memory cells MC[0] ... MC[N] to the register 415 in a read operation. The register 415 is further configured to receive a control signal LCK, and has an output Reg_Out. The output Reg_Out of the register 415 is coupled to a first input LOC_1 of the logic circuit 416. The logic circuit 416 further comprises a second input LOC_2 configured to receive input data IN, for example, from an input buffer as described herein. An output LOC_Out of the logic circuit 416 is coupled to the MAC circuit 417.

Figure 4B:
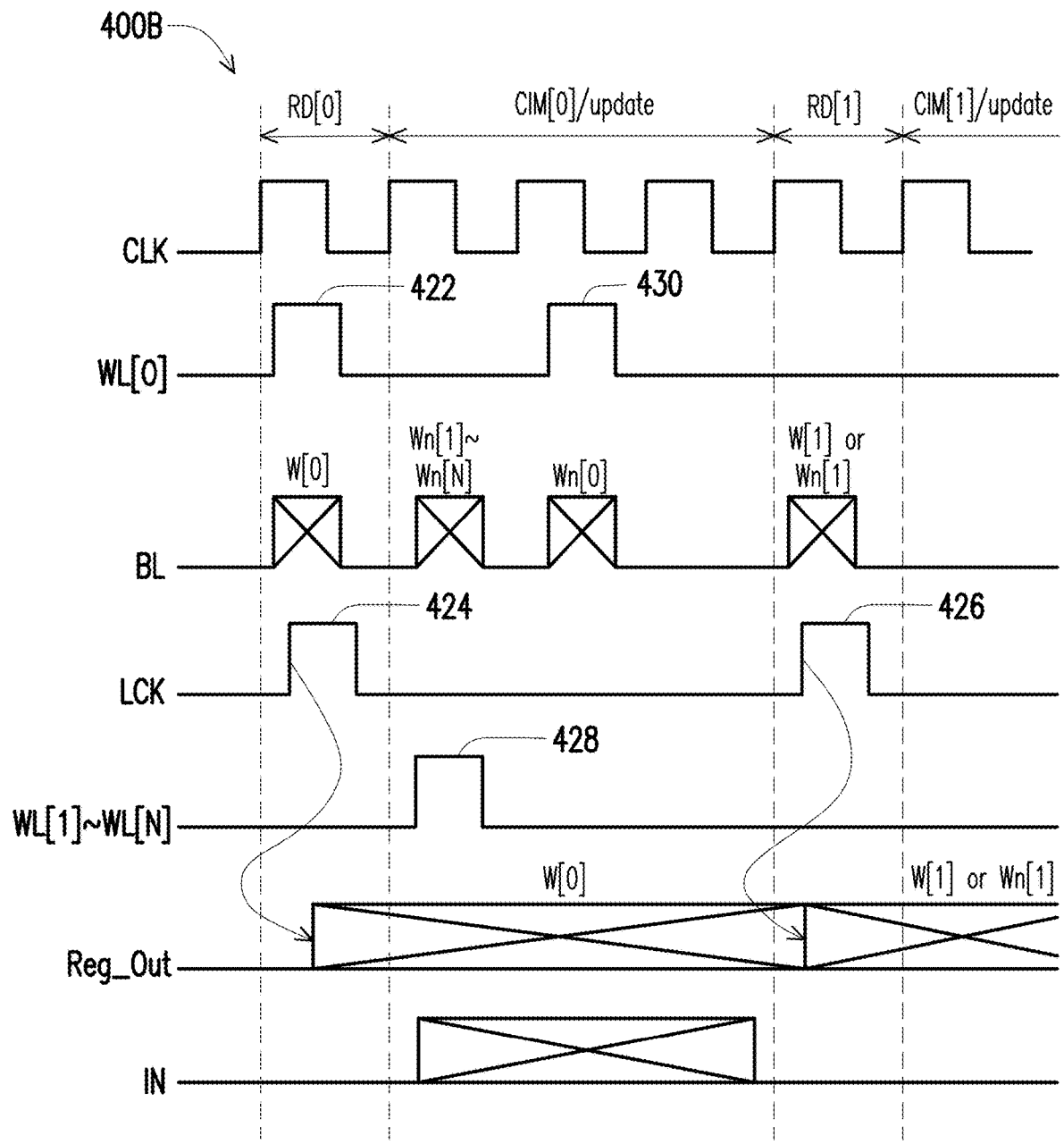
FIG. 4B is a timing diagram of an example operation in a section corresponding to a memory segment of a memory device, in accordance with some embodiments.

FIG. 4B is a timing diagram of an example operation 400B in the section of the memory device 400A, in accordance with some embodiments. The example operation 400B in FIG. 4B is performed in accordance with a clock signal CLK having a plurality of clock pulses.

In a read period RD[0], the memory cell MC[0] is accessed in a read operation by a pulse 422 on the word line WL[0]. The weight data W[0] currently stored in the memory cell MC[0] are read out from the memory cell MC[0], occurs on the bit line BL, and is supplied by the bit line BL to the input Reg_In of the register 415. In FIG. 4B, the weight data W[0] are schematically illustrated to indicate that the weight data W[0] may include a logic "1" (high level) or a logic "0" (low level). Other weight data and/or input data in FIG. 4B are schematically illustrated in a similar manner.

In the read period RD[0], a pulse 424 of a control signal LCK is supplied to the register 415. For example, the control signal LCK is generated by or supplied from a memory controller corresponding to the memory controller 120. In at least one embodiment, the register 415, e.g., a flip-flop, is configured to latch data or a logic state at the input Reg_In in response to a rising edge of the pulse 424 of the control signal LCK. The latched data or logic state are maintained at the output Reg_Out of the register 415 until the rising edge of a next pulse 426 of the control signal LCK. As a result, the weight data W[0] read from the memory cell MC[0] are latched at the output Reg_Out of the register 415 during a period between the rising edges of the pulses 424, 426, and are not affected by data on the bit line BL.

In a next period, designated as CIM[0]/Update in FIG. 4B, a CIM operation is performed using the latched weight data W[0] while, simultaneously, weight data updating is performed for one or more of the memory cells in the memory segment 412. In the CIM operation, the latched weight data W[0] at the output Reg_Out of the register 415 are supplied to the input LOC_1 of the logic circuit 416. The input data IN are supplied to the other input LOC_2 of the logic circuit 416. In some embodiments, the input data IN comprises multiple bits serially supplied over several clock cycles to the logic circuit 416 to be processed together with the weight data W[0]. In at least one embodiment, the logic circuit 416 is configured to multiply the series of bits in the input data IN with the weight data W[0], and output the multiplication result to the MAC circuit 417 which is configured to perform further processing such as addition, shift, or the like, to obtain a final result of the CIM operation.

While the CIM operation is being performed using the latched weight data W[0], the bit line BL is isolated by the register 415 from the logic circuit 416 and MAC circuit 417, and is usable for weight data updating in one or more of the memory cells without affecting the CIM operation, and without being affected by the CIM memory device. For example, one of the memory cells MC[1]~MC[N] is accessed in a write operation by a pulse 428 on the corresponding word line WL[1]_WL[N]. A corresponding new piece of weight data Wn[1]~Wn[N] is supplied from the weight buffer 414 to the bit line BL and is written, or updated, in the accessed memory cell among the memory cells MC[1]~MC[N].

In some embodiments, depending on the length of the series of bits in the input data IN which defines the length of the CIM[0]/Update period, it is possible to perform weight data updating for more than one memory cells while the CIM operation is performed using the latched weight data W[0] read from the memory cell MC[0]. For example, while the CIM operation is still being performed using the latched weight data W[0], the memory cell MC[0] is accessed in a write operation by a pulse 430 on the corresponding word line WL[0]. A corresponding new piece of weight data Wn[0] is supplied from the weight buffer 414 to the bit line BL and is written, or updated, in the accessed memory cell MC[0]. In at least one embodiment, it is possible to update weight data for more than two memory cells while the CIM operation is being performed using the latched weight data W[0] read from one memory cell.

In a next read period RD[1], the memory cell MC[1] is accessed in a read operation by a corresponding pulse on the corresponding word line WL[1] (not shown in FIG. 4B). The weight data W[1] currently stored in the memory cell MC[1] are read out from the memory cell MC[1] and placed on the bit line BL, provided that the memory cell MC[1] was not updated earlier, for example, by pulse 428. However, if the memory cell MC[1] was updated earlier, the new weight data Wn[1] is read out and placed on the bit line BL. In response to the rising edge of the pulse 426 in the control signal LCK, the weight data W[1] or the new weight data Wn[1] are latched at the output Reg_Out of the register 415 and supplied to the input LOC_1 of the logic circuit 416 for a CIM operation in a next period, designated as CIM[1]/Update in FIG. 4B, and the described process is repeatedly performed. In some embodiments, the described operation and configuration are applicable even when the memory segment 412 comprises multi-port memory cells. The described operation and configuration make it possible, in some embodiments, to perform weight data updating and CIM operations simultaneously, saving processing time, power consumption, or the like. In at least one embodiment, one or more advantages described herein are achievable by the memory device 400A and/or the operation 400B.

Figure 4C:
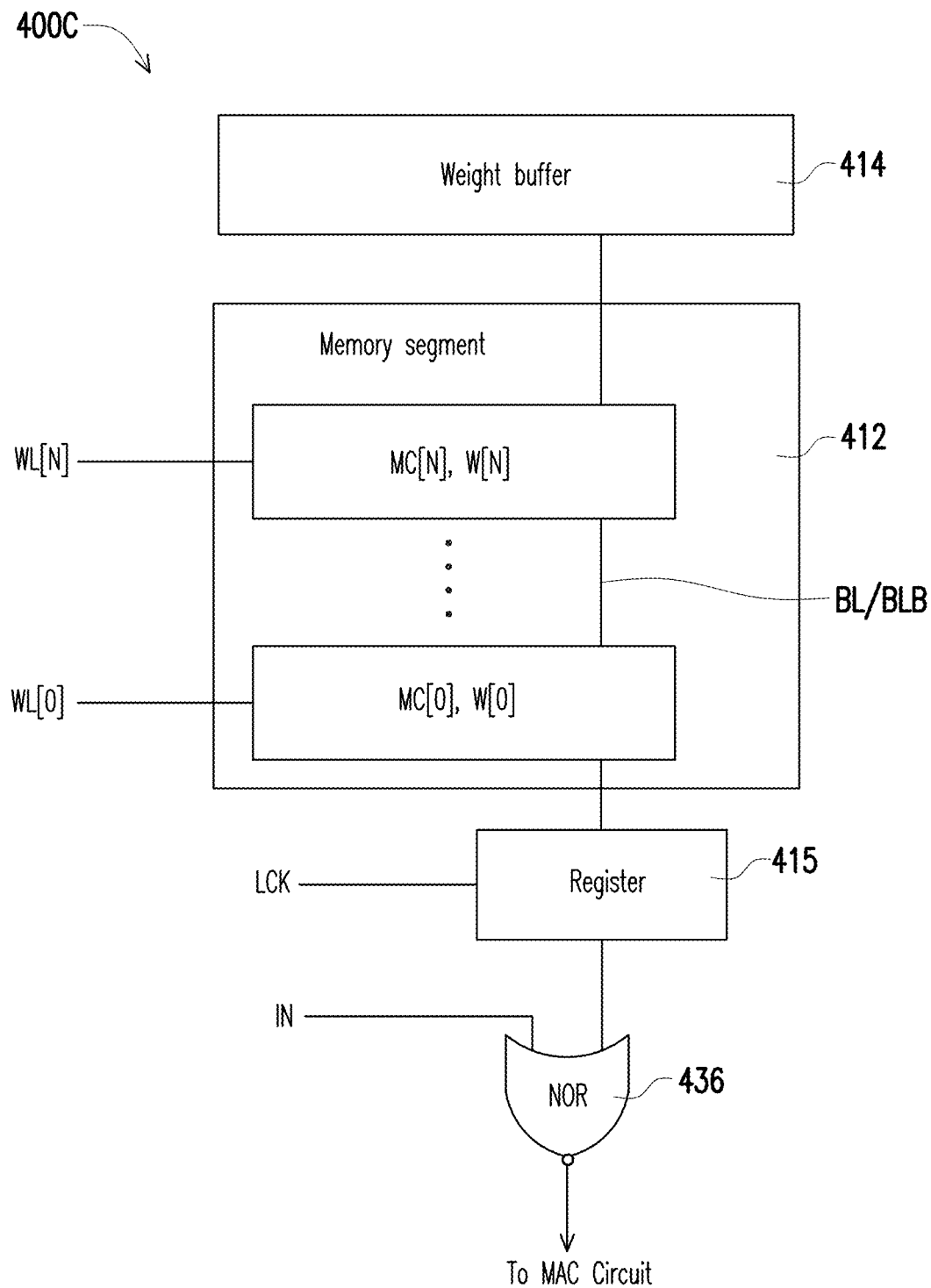
FIG. 4C is a schematic diagram of a section corresponding to a memory segment of a memory device, in accordance with some embodiments.

FIG. 4C is a schematic diagram of a section corresponding to a memory segment of a memory device 400C, in accordance with some embodiments. Components in FIG. 4C having corresponding components in FIG. 4A are designated by the same reference numerals as in FIG. 4A.

A different between the memory device 400C and the memory device 400A is that the logic circuit 416 in the memory device 400A is implemented by a NOR gate 436 in the memory device 400C. The operation of the memory device 400C is similar to that described with respect to FIGS. 4A-4B. In at least one embodiment, one or more advantages described herein are achievable by the memory device 400C.

Figure 4D:
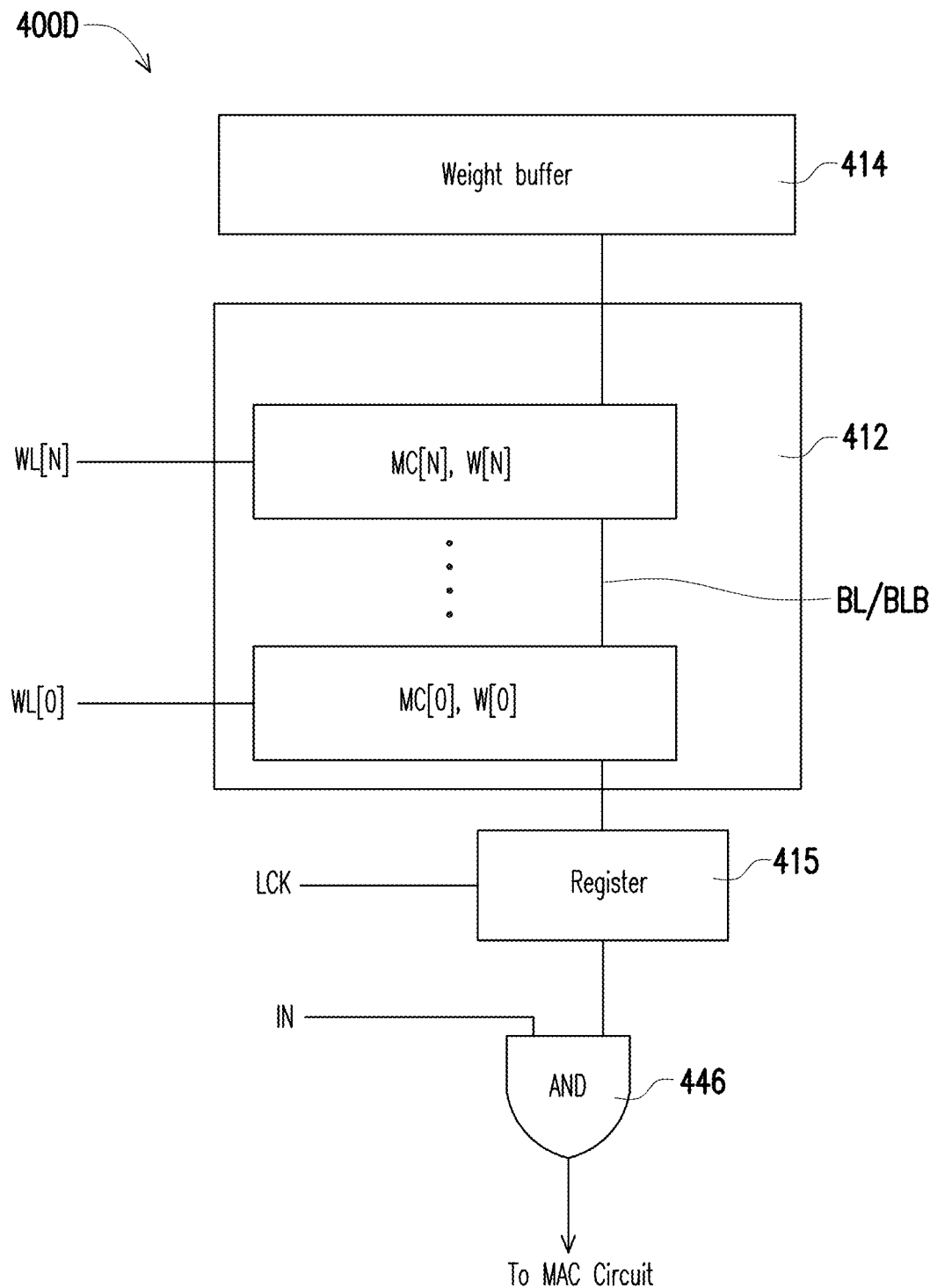
FIG. 4D is a schematic diagram of a section corresponding to a memory segment of a memory device, in accordance with some embodiments.

FIG. 4D is a schematic diagram of a section corresponding to a memory segment of a memory device 400D, in accordance with some embodiments. Components in FIG. 4D having corresponding components in FIG. 4A are designated by the same reference numerals as in FIG. 4A.

A different between the memory device 400D and the memory device 400A is that the logic circuit 416 in the memory device 400A is implemented by an AND gate 446 in the memory device 400D. The operation of the memory device 400D is similar to that described with respect to FIGS. 4A-4B. In at least one embodiment, one or more advantages described herein are achievable by the memory device 400D. The described configurations of the logic circuit as including a NOR gate or an AND gate are examples. Other logic circuit configurations are within the scopes of various embodiments.

Figure 4E:
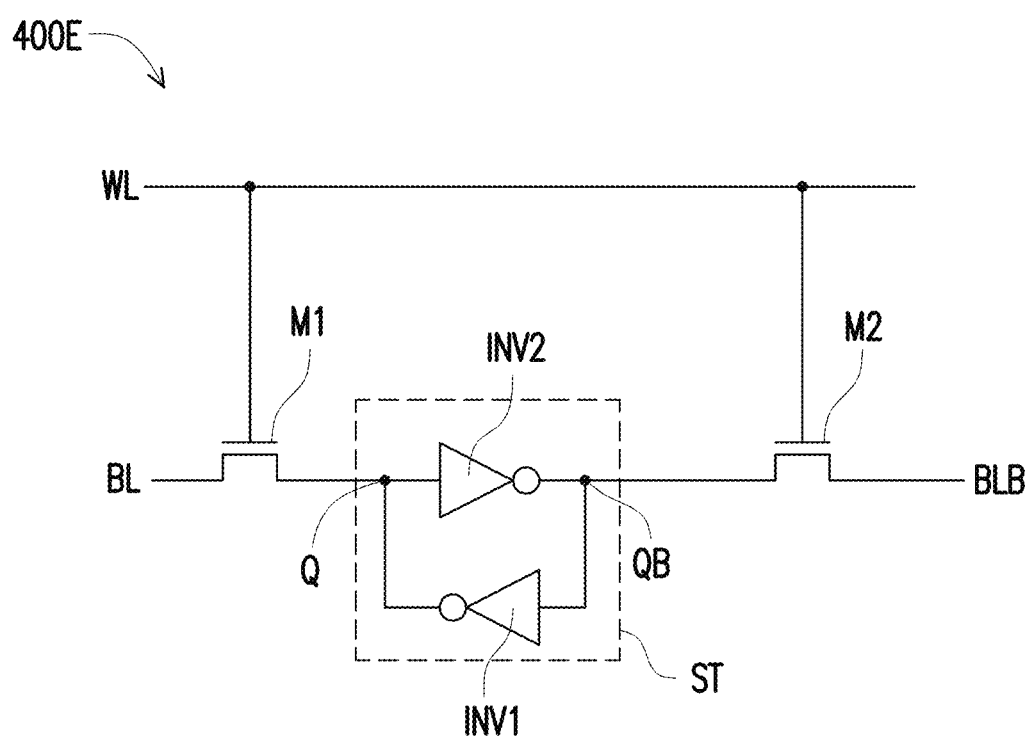
FIG. 4E is a schematic circuit diagram of an example single port memory cell, in accordance with some embodiments.

FIG. 4E is a schematic circuit diagram of an example single port memory cell 400E, in accordance with some embodiments. In at least one embodiment, the memory cell 400E corresponds to one or more memory cells in one or more of the memory devices 100A, 300, 400A, 400C, 400D.

The memory cell 400E comprises transistors M1, M2, and inverters INV1, INV2. An input of the inverter INV2 is coupled to an output of the inverter INV1 at a node Q. An output of the inverter INV2 is coupled to an input of the inverter INV1 at a node QB. Gates of the transistors M1, M2 are coupled to a word line WL. The transistor M1 is serially coupled between the node Q and a bit line BL. The transistor M2 is serially coupled between the node QB and a complementary bit line BLB. The inverters INV1, INV2 form a storage circuit ST for storing a datum corresponding to a logic state of the node Q or QB. The transistors M1, M2 are access transistors configured to couple the storage circuit ST to the bit lines BL/BLB for read access or write access, in response to an appropriate voltage applied to the word line WL. In some embodiments, each of the inverters INV1, INV2 comprises two transistors, resulting in a total of 6 transistors in the memory cell 400E, which is also referred to as a 6 T (6 transistors) SRAM memory cell. Examples of the transistors in the memory cell 400E include, but are not limited to, metal oxide semiconductor field effect transistors (MOSFET), complementary metal oxide semiconductor (CMOS) transistors, bipolar junction transistors (BJT), high voltage transistors, high frequency transistors, p-channel and/or n-channel field effect transistors (PFETs/NFETs), FinFETs, planar MOS transistors with raised source/drains, or the like. The described configuration of a single-port memory cell is an example. Other single-port memory cell configurations are within the scopes of various embodiments.

Figure 5A:
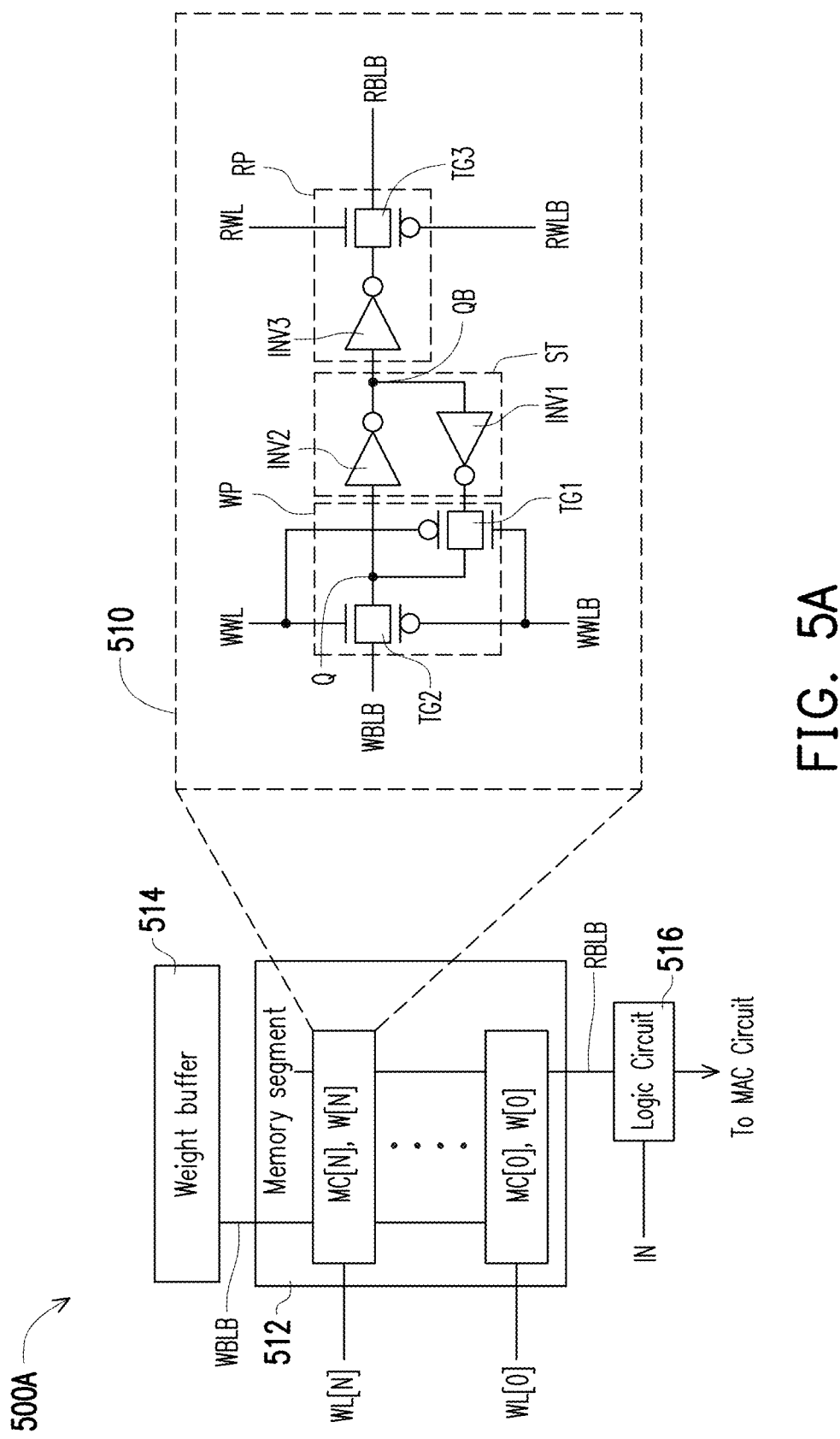
FIG. 5A is a schematic diagram of a section corresponding to a memory segment of a memory device, in accordance with some embodiments.

FIG. 5A is a schematic diagram of a section corresponding to a memory segment of a memory device 500A, in accordance with some embodiments. In some embodiments, the memory device 500A corresponds to at least one of the memory devices 100B, 300.

In the section shown in FIG. 5A, the memory device 500A comprises a memory segment 512, a weight buffer 514, and a logic circuit 516. The memory device 500A further comprises a MAC circuit (not shown) coupled to an output of the logic circuit 516. In some embodiments, the memory segment 512, weight buffer 514 and logic circuit 516 correspond to the memory segment 412, weight buffer 414 and logic circuit 416 in the memory device 400A.

A difference between the memory device 400A and memory device 500A is that in the memory device 400A, the memory segment 412 comprises single-port memory cells, whereas in the memory device 500A, the memory segment 512 comprises multi-port memory cells. In the example configuration in FIG. 5A, a set of word lines WL[0] . . . WL[N] is configured as both write word lines and read word lines. Other configurations with a set of write word lines and a separate set of read word lines are within the scopes of various embodiments. The multi-port memory cells in the memory segment 512 are coupled to the weight buffer 514 by a write bit line WBLB which is a different bit line from a read bit line RBLB by which the multi-port memory cells of the memory segment 512 are coupled to the logic circuit 516. In the example configuration in FIG. 5A, a register corresponding to the register 415 is omitted. In at least one embodiment, a register corresponding to the register 415 is included in the memory device 500A, between the read bit line RBLB and the logic circuit 516. In some embodiments, the logic circuit 516 comprises a NOR gate or an AND gate. Other logic circuit configurations are within the scopes of various embodiments.

FIG. 5A shows a schematic circuit diagram of an example multi-port memory cell 510, in accordance with some embodiments. In the example configuration in FIG. 5A, the multi-port memory cell 510 comprises inverters INV1, INV2, INV3 and transmission gates TG1, TG2, TG3. The inverters INV1, INV2 are coupled to form a storage circuit ST as described with respect to FIG. 4E. Each of the transmission gates TG1, TG2, TG3 comprises an NMOS transistor and a NMOS transistor. The gates of the PMOS and NMOS transistors in the transmission gate TG1 are correspondingly coupled to a pair of write word lines WWL/WWLB. The gates of the NMOS and PMOS transistors in the transmission gate TG2 are correspondingly coupled to the write word lines WWL/WWLB. The gates of the NMOS and PMOS transistors in the transmission gate TG3 are correspondingly coupled to a pair of read word lines RWL/RWLB. The transmission gate TG1 is coupled between the node Q and the output of the inverter INV1. The transmission gate TG2 is coupled between the node Q and a complementary write bit line WBLB. The transmission gate TG3 is coupled between an output of the inverter INV3 and a complementary read bit line RBLB. An input of the inverter INV3 is coupled to the node QB. The transmission gates TG1, TG2 form a write port WP. The inverter INV3 and the transmission gate TG3 form an output buffer or a read port RP. There are a total of 12 transistors in the described multi-port memory cell 510 which is also referred to as a 12 T SRAM memory cell. The described configuration of the multi-port memory cell 510 is an example. Other multi-port memory cell configurations are within the scopes of various embodiments.

When the transmission gate TG3 is turned ON by appropriate voltages on the read word lines RWL/RWLB, the stored piece of weight data corresponding to the logic state of the node QB is read through the inverter INV3 and the turned ON transmission gate TG3, and is supplied to the read bit line RBLB for use in a CIM operation. Meanwhile, new weight data are applicable to the write bit line WBLB to update another memory cell of the memory segment 512, without affecting the stored and/or read weight data of the memory cell MC[N] because the transmission gates TG1, TG2 are not turned ON. As a result, it is possible to simultaneously perform CIM operations and weight data updating for different memory cells in the memory segment 512, as also described with respect to FIG. 1B. In at least one embodiment, a register corresponding to the register 415 is included in the memory device 500A and is coupled between the read bit line RBLB and the logic circuit 516 in a manner similar to the memory device 400A. In one or more embodiments, a register, when included in the memory device 500A, makes it possible to hold the latched weight data at the input of the logic circuit 516 for an extended period of time, which may be difficult to achieve if the register is not included. In at least one embodiment, one or more advantages described herein are achievable by the memory device 500A.

Figure 5B:
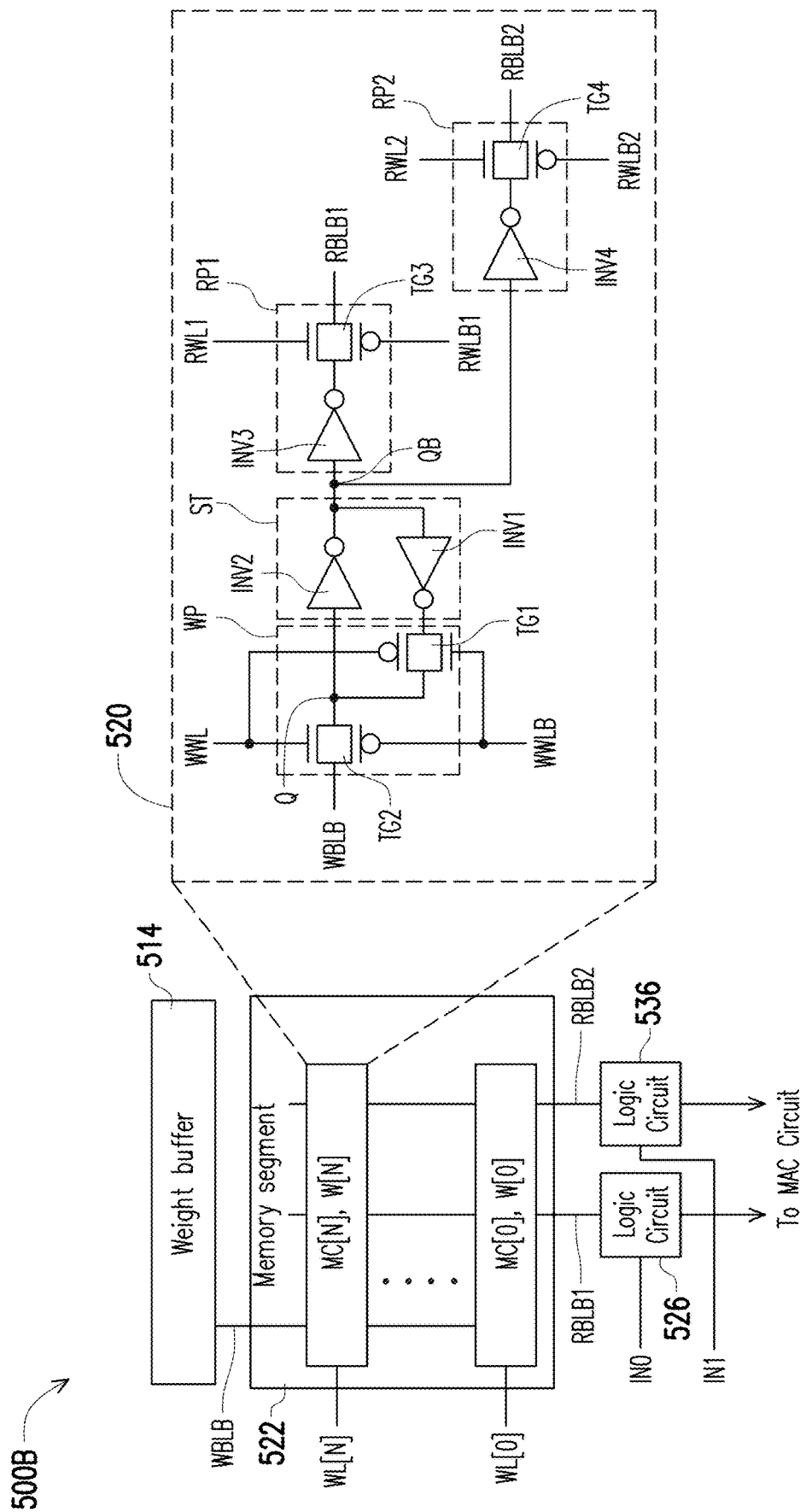
FIG. 5B is a schematic diagram of a section corresponding to a memory segment of a memory device, in accordance with some embodiments.

FIG. 5B is a schematic diagram of a section corresponding to a memory segment of a memory device 500B, in accordance with some embodiments. In some embodiments, the memory device 500B corresponds to at least one of the memory devices 100B, 300, 500A.

In the section shown in FIG. 5B, the memory device 500B comprises a memory segment 522, a weight buffer 514, and logic circuits 526, 536. The memory device 500B further comprises a MAC circuit (not shown) coupled to outputs of the logic circuits 526, 536. In some embodiments, the memory segment 522, and logic circuits 526, 536 correspond to the memory segment 512, and logic circuit 516 in the memory device 500A.

A difference between the memory device 500A and memory device 500B is described herein. In the memory device 500A, the memory segment 512 comprises multi-port memory cells each having one read port RP, whereas in the memory device 500B, the memory segment 522 comprises multi-port memory cells each having two read ports RP1, RP2. The memory cells in the memory segment 522 are referred to herein as multi-read-port memory cells. In the example configuration in FIG. 5B, for simplicity, a set of word lines WL[0] . . . WL[N] is illustrated. In some embodiments, a set of write word lines WWL, a separate set of first read word lines RWL1, and a separate set of second read word lines RWL2 are provided to separately access the write port WP and the two read ports RP1, RP2 of each memory cell in the memory segment 522. Other configurations are within the scopes of various embodiments. The multi-read-port memory cells in the memory segment 522 are coupled to the weight buffer 514 by a write bit line WBLB which is a different bit line from the first and second read bit lines RBLB1, RBLB2 by which each of the multi-read-port memory cells of the memory segment 522 are coupled to the logic circuits 526, 536. In some embodiments, each of the logic circuits 526, 536 comprises a NOR gate or an AND gate. Other logic circuit configurations are within the scopes of various embodiments.

FIG. 5B shows a schematic circuit diagram of an example multi-read-port memory cell 520, in accordance with some embodiments. In the example configuration in FIG. 5B, the multi-read-port memory cell 520 is similar to the multi-port memory cell 510 described with respect to FIG. 5A, except that the multi-read-port memory cell 520 in FIG. 5B additionally comprises an inverter INV4 and a transmission gate TG4. Like the multi-port memory cell 510, the multi-read-port memory cell 520 comprises the inverter INV3 and the transmission gate TG3 forming a first read port RP1 coupled to first read word lines RWL1/RWLB1 and a first read bit line RBLB1. Similarly, the inverter INV4 and the transmission gate TG4 form a second read port RP2 coupled to second read word lines RWL2/RWLB2 and a second read bit line RBLB2. The described configuration of the multi-read-port memory cell 520 is an example. Other multi-read-port memory cell configurations are within the scopes of various embodiments.

Because each memory cell in the memory segment 522 has two read ports, it is possible, in one or more embodiments, to simultaneously read the weight data from two different memory cells correspondingly through the read bit lines RBLB1, RBLB2 for CIM operations, and also to update the weight data in one or more further memory cells in the memory segment 522 through the write bit line WBLB. For example, the first weight data on the first read bit line RBLB1 are read from the memory cell MC[0], and are combined, e.g., multiplied, with a first set of input data IN0 by the logic circuit 526.

The second weight data on the second read bit line RBLB2 are read from the memory cell MC[1], and are combined, e.g., multiplied, with a second set of input data IN1 by the logic circuit 536. The results, or intermediate data, output by the logic circuits 526, 536 are supplied to the MAC circuit for further processing to complete the CIM operation. At the same time, one or more of the remaining memory cells, i.e., MC[2]~MC[N], are updated with new weight data from the weight buffer 514 through the write bit line WBLB. As a result, it is possible to simultaneously perform CIM operations and weight data updating for different memory cells in the memory segment 522, as also described with respect to one or more of FIGS. 1B, 5A. In at least one embodiment, one or more advantages described herein are achievable by the memory device 500B.

Figure 5C:
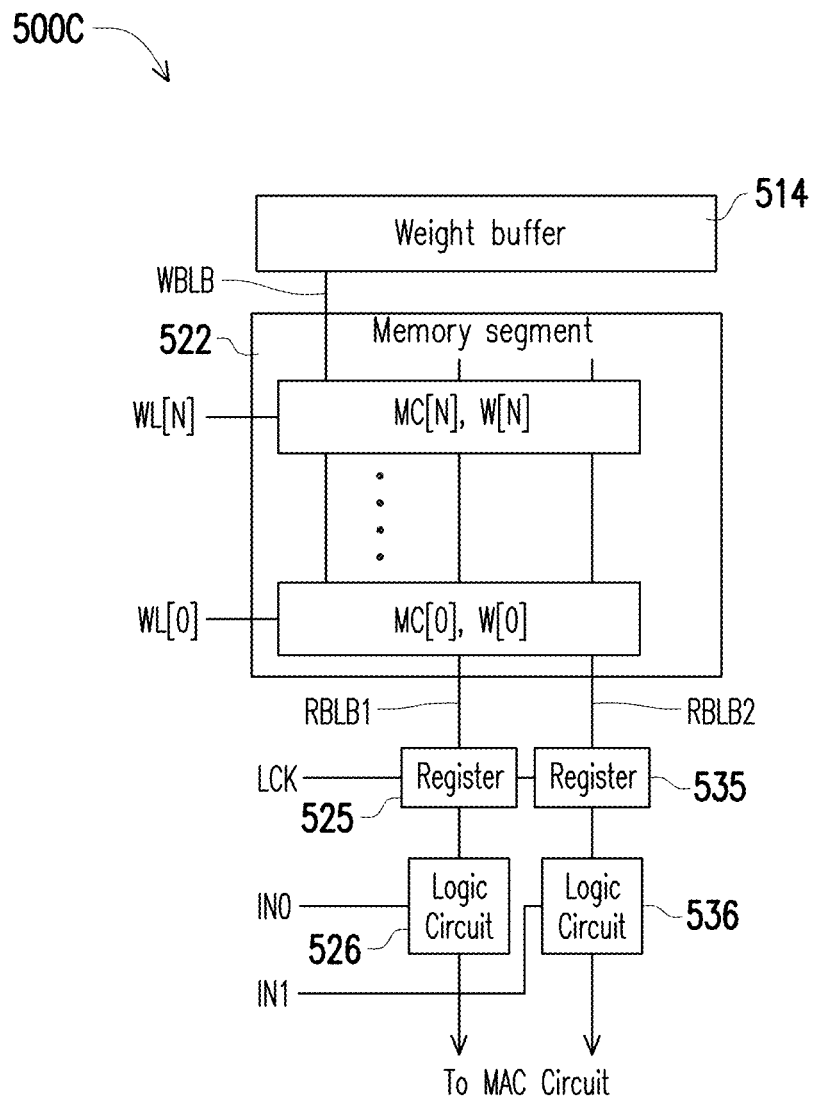
FIG. 5C is a schematic diagram of a section corresponding to a memory segment of a memory device, in accordance with some embodiments.

FIG. 5C is a schematic diagram of a section corresponding to a memory segment of a memory device 500C, in accordance with some embodiments. In some embodiments, the memory device 500C corresponds to at least one of the memory devices 100B, 300, 500A, 500B.

Compared to the memory device 500B, the memory device 500C additionally comprises registers 525, 535 coupled correspondingly to the read bit lines RBLB1, RBLB2 to latch the weight data on the read bit lines RBLB1, RBLB2 in response to the same control signal LCK, and supply the latched weight data to the corresponding logic circuits 526, 536, in a manner similar to the register 415 described with respect to FIG. 4A. In at least one embodiment, the registers 525, 535 make it possible to hold the latched weight data at the inputs of the logic circuits 526, 536 for an extended period of time, which may be difficult to achieve if the registers 525, 535 are not included. In at least one embodiment, one or more advantages described herein are achievable by the memory device 500C.

Figure 6A:
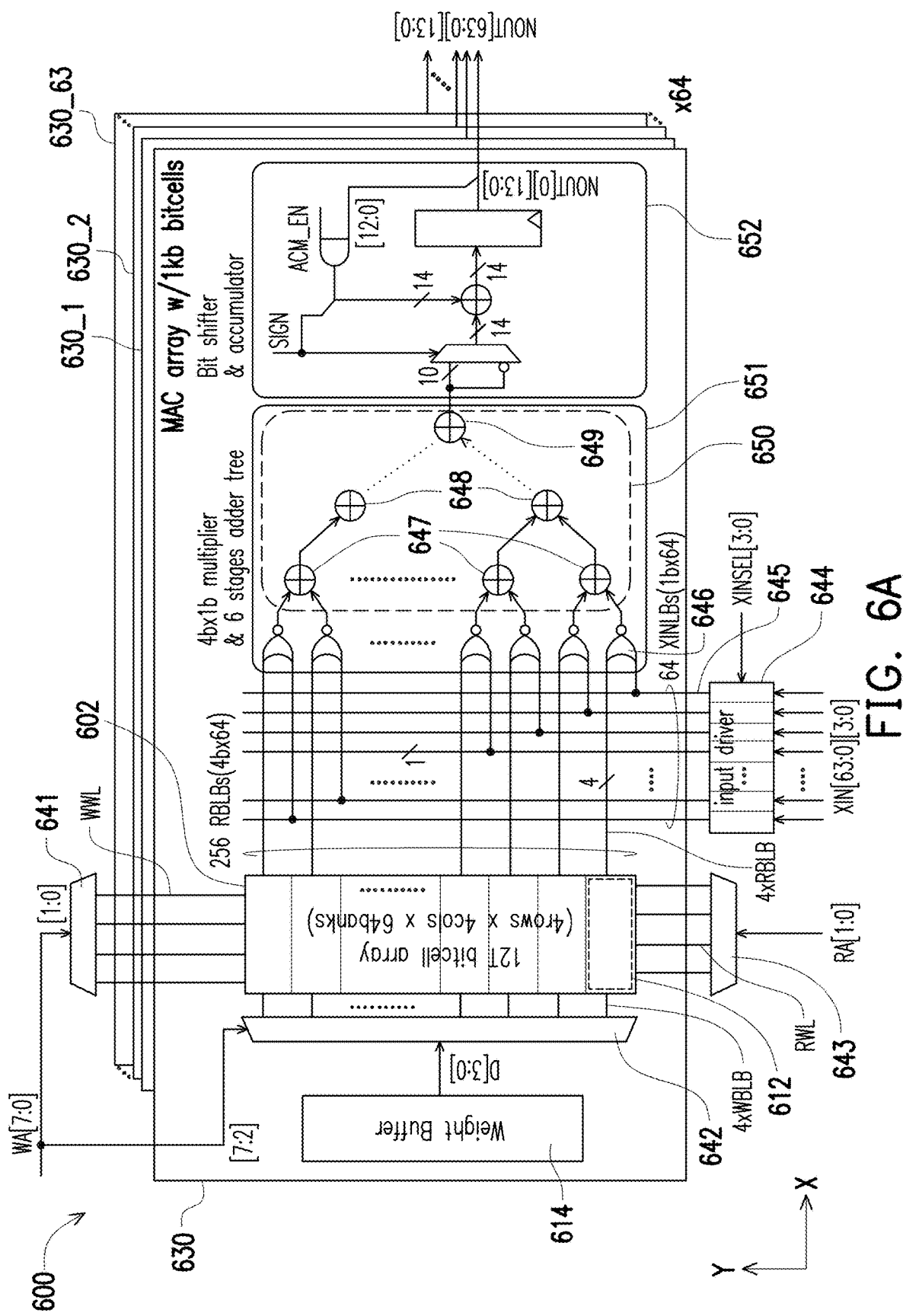
FIG. 6A is a schematic diagram of a memory device, in accordance with some embodiments.

FIG. 6A is a schematic diagram of a memory device 600, in accordance with some embodiments. In some embodiments, the memory device 600 corresponds to one or more of memory devices 100B, 300, 500A.

The memory device 600 comprises 64 memory macros 630, 6301, 630_2 . . . 630_63. In at least one embodiment, the 64 memory macros are identical or similarly configured. The memory macro 630 is described herein in detail. Detailed descriptions of the other memory macros are omitted for simplicity. In some embodiments, the memory device 600 further comprises a memory controller (not shown) coupled to and configured to control one or more of the 64 memory macros. In some embodiments, a number of the 64 memory macros are sequentially coupled as described with respect to FIG. 2A to implement a neural network. The described number of 64 memory macros is an example. Other numbers of memory macros included in the memory device 600 are within the scopes of various embodiments.

The memory macro 630 comprises a memory array 602 which is divided into 64 memory segments each having 4 rows and 4 columns of 16 memory cells. A representative memory segment 612 is indicated in FIG. 6A. In at least one embodiment, the memory segment 612 corresponds to the memory segment 512 described with respect to FIG. 5A. The 64 memory segments are stacked side-by-side along the Y direction. In some embodiments, the memory cells in the memory array 602 are multi-port memory cells. In at least one embodiment, the multi-port memory cells are 12 T SRAM memory cells as described with respect to FIG. 5A. The number of memory segments in the memory array 602 and/or the size of each memory segment are examples. Other configurations are within the scopes of various embodiments.

The memory macro 630 further comprises a weight buffer 614. In at least one embodiment, the weight buffer 614 corresponds to the weight buffer 514 described with respect to FIG. 5A. The weight buffer 614 is coupled to the memory array 602 via a weight demux 642 and 256 write bit lines WBLB which extend along the X direction. Four write bit lines WBLB are coupled to the corresponding four memory columns in the memory segment 612, and are commonly indicated by a label "4×WBLB" in FIG. 6A. In at least one embodiment, each of the write bit lines WBLB and the corresponding memory column correspond to the write bit line WBLB and the memory segment 512 (which is a memory column) described with respect to FIG. 5A. The four write bit lines WBLB coupled to the memory segment 612 are configured to update a memory row of four memory cells in the memory segment 612 with a 4-bit word D[3:0] output from the weight buffer 614. The memory segment 612 and the corresponding four write bit lines WBLB are selected by 6 bits, i.e., bits [7:2], of an 8-bit write access signal WA applied to the weight demux 642. The remaining 2 bits, i.e., bits [1:0], of the write access signal WA are applied to a write address demux 641 to select one write word line WWL among four write word line WWLs of the memory array 602. The selected one write word line WWL corresponds to the memory row in the memory segment 612 where the word D[3:0] of weight data is to be written. In the example configuration in FIG. 6A, four bits of weight data are updated at the same time across a memory row in the memory segment 612. In at least one embodiment, the four write word line WWLs correspond to the write word lines described with respect to FIG. 5A. By using the weight demux 642, the weight buffer 614 is usable as a common weight buffer for multiple memory segments. The described numbers of weight data bits, write bit lines WBLB and write word lines WWL are example. Other configurations are within the scopes of various embodiments.

A read access signal RA having 2 bits, i.e., [1:0], is applied to a read address demux 643 to select one read word line RWL among four read word line RWLs of the memory array 602. The selected one read word line RWL corresponds to the memory row in the memory segment 612 from which a stored 4-bit word of weight data is to be read out for CIM operations. In the example configuration in FIG. 6A, four bits of weight data are read out at the same time from a memory row in the memory segment 612. In at least one embodiment, the four read word line RWLs correspond to the write word lines described with respect to FIG. 5A.

The memory macro 630 comprises 256 read bit lines RBLB including 64 groups of four read bit lines RBLB in each group. The 64 groups correspond to the 64 memory segments. The four read bit lines RBLB in each group are coupled to the corresponding four memory columns in the corresponding memory segment. For example, four read bit lines RBLB coupled to four memory columns in the memory segment 612 are commonly indicated by a label "4×RBLB" in FIG. 6A. In at least one embodiment, each of the four read bit lines RBLB corresponds to the read bit line RBLB described with respect to FIG. 5A. When one of the read word lines RWL is selected, four bits of weight data are read out at the same time from the corresponding memory row in the memory segment 612, and are output onto the corresponding four read bit lines RBLB. Across all 64 memory segments, 256 bits of weight data are output onto the corresponding 256 read bit lines RBLB when one of the read word lines RWL is selected. The described numbers of weight data bits, read bit lines RBLB and read word lines RWL are example. Other configurations are within the scopes of various embodiments.

An input driver 644 is configured to receive input data XIN including 256 bits divided into 64 groups, i.e., [63:0], of four bits, i.e., [3:0], in each group. The input driver 644 comprises 64 input driver blocks each configured to convert 4 bits of input data in the corresponding group into a stream of the same four bits sequentially output onto one data line XINLB among a total of 64 data lines XINLB coupled to the input driver 644. The conversion from four parallel bits into a stream of four serial bits is performed in accordance with a selection signal XINSEL[3:0]. In some embodiments, the stream of four serial bits on a data line 645 corresponds to the input data IN described with respect to FIG. 5A. A detailed description of the input driver 644 is given with respect to FIG. 6B.

The memory macro 630 further comprises 64 logic circuits which are schematically illustrated in FIG. 6A as NOR gates. Each of the 64 logic circuits is coupled to a corresponding data line among the 64 data lines XINLB, and a corresponding group of four read bit lines RBLB. For example, a logic circuit 646 is coupled to the data line 645 and the four read bit lines RBLB corresponding to the memory segment 612. In at least one embodiment, the logic circuit 646 corresponds to the logic circuit 516 described with respect to FIG. 5A. In some embodiments, the 64 logic circuits are 4-bit by 1-bit multipliers, as described herein with respect to FIG. 6B.

The memory macro 630 further comprises an adder tree 650 comprising a plurality of adders arranged in multiple stages to accumulate the multiplication results output from the 64 logic circuits or multipliers. In the example configuration in FIG. 6A, the adder tree 650 includes six stages, including adders 647 in the first stage, adders 648 in the second stage, and an adder 649 in the sixth stage. In some embodiments, the adder tree 650 and the 64 logic circuits together form a MAC circuit 651. The result output from the final adder 649 comprises a 10-bit word, in one or more embodiments. In the example configuration in FIG. 6A, the memory macro 630 further comprises a bit shifter and accumulator 652 configured to further perform bit shifting and/or accumulation in response to control signals SIGN and ACM_EN. In some embodiments, the bit shifter and accumulator 652 is simplified or omitted, or has a different configuration. The result of the CIM operation based on the weight data stored in the memory array 602 and the input data XIN is outputted from the memory macro 630 as NOUT. In the example configuration in FIG. 6A, the weight buffer 614 and weight demux 642 are included in the memory macro 630, whereas the write address demux 641, read address demux 643 and input driver 644 are outside the memory macro 630 and are included in a memory controller as described herein.

Figure 6B:
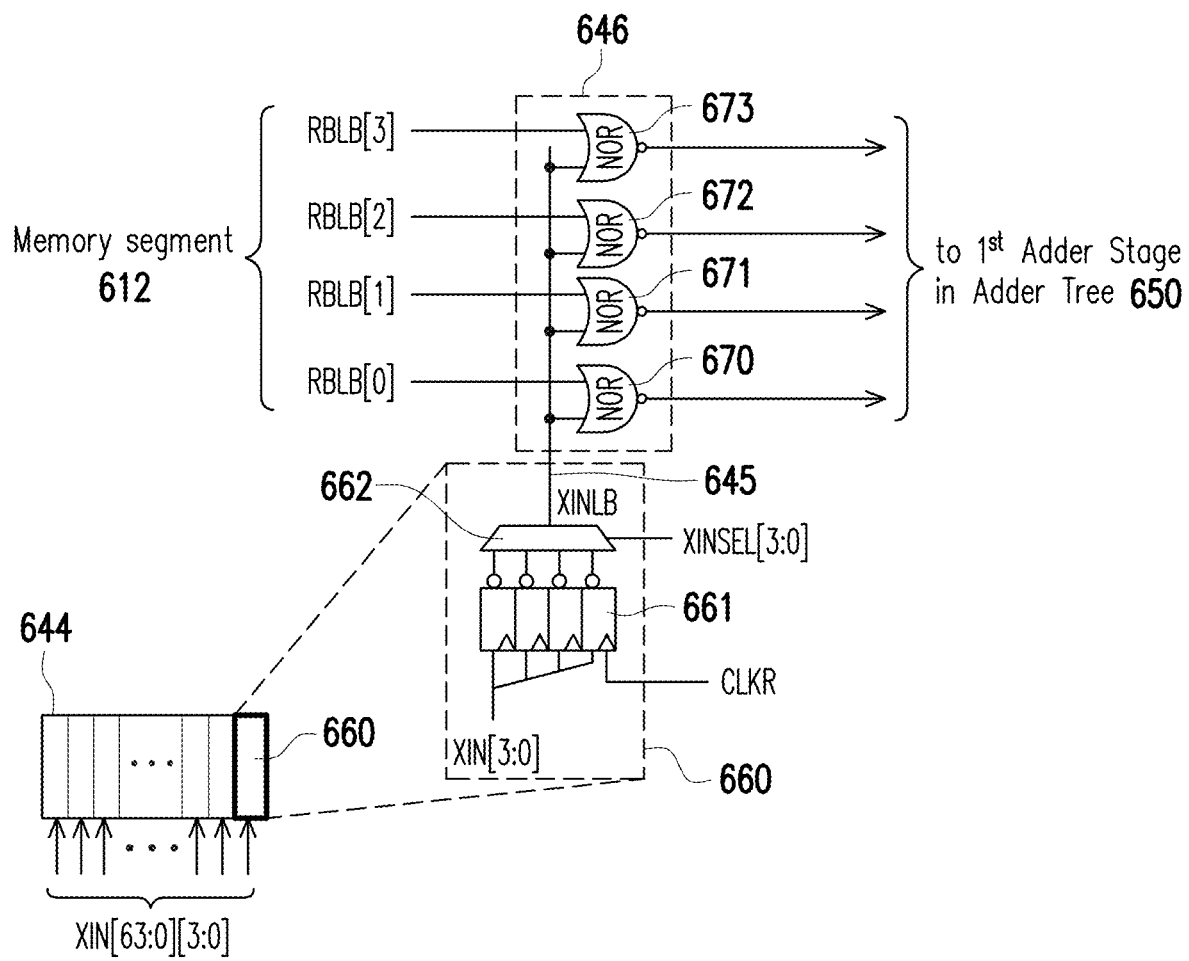
FIG. 6B is a schematic circuit diagram of an input driver and a corresponding logic circuit in a memory device, in accordance with some embodiments.

FIG. 6B is a schematic circuit diagram of the input driver 644 and a logic circuit 646 in the memory device 600, in accordance with some embodiments.

The input driver 644 comprises 64 similarly configured input driver blocks. A representative input driver block 660 is illustrated in greater detail in FIG. 6B. The input driver block 660 comprises four flip-flops (one of which is indicated at 661) and a MUX 662. Four bits of input data XIN[3:0] are correspondingly input in parallel into the four flip-flops which have outputs coupled to inputs of the MUX 662. The MUX 662 sequentially outputs the four bits of input data onto the data line 645, in accordance with the signal XINSEL[3:0].

The logic circuit 646 comprises four NOR gates 670-673. First inputs of the NOR gates 670-673 are commonly coupled to the data line 645 to receive the sequence of four bits of input data. Second inputs of the NOR gates 670-673 are correspondingly coupled to the read bit lines RBLB [0]~[3] coupled to the corresponding four memory columns in the memory segment 612. Four bits of weight data read from a selected row of the memory segment 612 are applied to the second inputs of the NOR gates 670-673.

In a first clock cycle, the NOR gates 670-673 multiply each bit of the four bits of weight data with a first bit in the sequence of four bits of input data, and corresponding first results are output to the corresponding adder(s) in the first stage of the adder tree 650. In a second clock cycle, the NOR gates 670-673 multiply each bit of the four bits of weight data with a second bit in the sequence of four bits of input data, and corresponding second results are output to the corresponding adder(s) in the first stage of the adder tree 650. In a third clock cycle, the NOR gates 670-673 multiply each bit of the four bits of weight data with a third bit in the sequence of four bits of input data, and corresponding third results are output to the corresponding adder(s) in the first stage of the adder tree 650. In a fourth clock cycle, the NOR gates 670-673 multiply each bit of the four bits of weight data with a fourth bit in the sequence of four bits of input data, and corresponding fourth results are output to the corresponding adder(s) in the first stage of the adder tree 650. In at least one embodiment, one or more advantages described herein are achievable by the memory device 600.

Figure 7A:
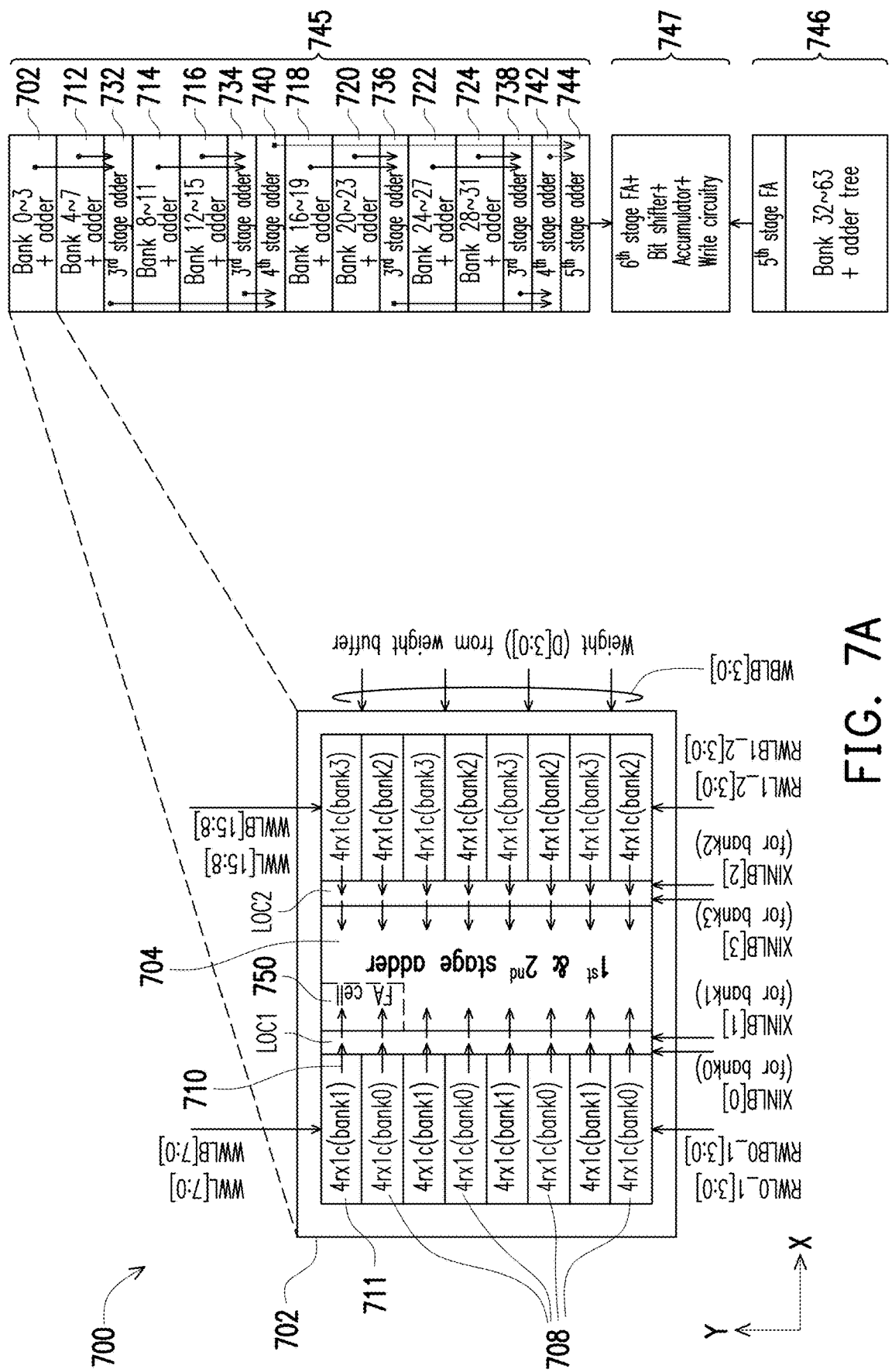
FIG. 7A is a schematic diagram of a memory device, in accordance with some embodiments.

FIG. 7A is a schematic diagram of a memory device 700, in accordance with some embodiments. In some embodiments, the memory device 700 corresponds to one or more of memory devices 100B, 300, 500A, 600.

A difference between the memory device 600 and the memory device 700 is described herein. In the memory device 600, each memory segment comprises multiple memory columns which are physically adjacent or consecutive to each other. In the memory device 700, each memory segment comprises multiple memory columns which are not physically adjacent, or are interleaved with memory columns of another memory segment.

For example, a section 702 of the memory device 700 is shown in detail in FIG. 7A. The section 702 comprises four memory banks, e.g., banks 0~3, out of 64 memory banks of the memory device 700. Each memory bank of the memory device 700 corresponds to a memory segment as described herein. Each memory bank of the memory device 700 comprises four memory columns each including four memory cells arranged along four corresponding rows. The memory columns extend along the X direction, and the rows extend along the Y direction perpendicular to the X direction. The section 702 comprises an adder region 704 including first and second stage adders corresponding to banks 0-3. Banks 0 and 1 are physically arranged on one side of the adder region 704 in the X direction. Banks 2 and 3 are physically arranged on the other side of the adder region 704 in the X direction. The section 702 comprises a logic circuit region LOC1 physically arranged between banks 0, 1 and the adder region 704 along the X direction. The section 702 further comprises a logic circuit region LOC2 physically arranged between banks 2, 3 and the adder region 704 along the X direction. The logic circuit regions LOC1, LOC2 comprise various logic circuits as described herein.

The memory columns of banks 0 and 1 are alternatingly arranged along the Y direction. For clarity, memory columns of bank 0 are commonly indicated at 708 in FIG. 7A. The memory columns of banks 2 and 3 are alternatingly arranged along the Y direction. The banks 0~3 are accessed in a read operation by corresponding read word lines RWL0_1[3:0], RWLB0_1[3:0], RWL1_2[3:0], RWLB1_2[3:0], and corresponding read bit lines. The read bit lines are schematically illustrated by arrows extending from the memory columns of banks 0-3 into the corresponding logic circuit regions LOC1, LOC2. For example, arrow 710 schematicaly designates a read bit line coupled between a memory column 711 of bank 1 and a corresponding logic circuit in the logic circuit region LOC1. The banks 0~3 are accessed in a write operation by corresponding write word lines WWL[7:0], WWLB[7:0], WWL[15:8], WWLB[15:8], and corresponding write bit lines WBLB[3:0]. The write bit lines WBLB are coupled to a weight buffer (not shown) to receive new weight data for updating one or more memory cells in the section 702.

Input data on a data line XINLB[0] are input into the logic circuit region LOC1 to be multiplied with weight data read out from bank 0. Input data on a data line XINLB[1] are input into the logic circuit region LOC1 to be multiplied with weight data read out from bank 1. Input data on a data line XINLB[2] are input into the logic circuit region LOC2 to be multiplied with weight data read out from bank 2. Input data on a data line XINLB[3] are input into the logic circuit region LOC2 to be multiplied with weight data read out from bank 3. In some embodiments, each of the input data on the data line XINLB[0]~[3] comprises a stream or series of input data bits, for example, as described with respect to FIG. 6B. Results of the multiplication of the weight data read out from the memory cells in banks 0~3 with the streams of input data are schematically illustrated by arrows extending from the logic circuit regions LOC1, LOC2 into the adder region 704. The adder region 704 comprises a plurality of full adder (FA) cells each of which includes first and second stage adders for accumulating the output results of multiplication. Details of a FA cell 750 are described with respect to FIG. 7B.

As shown on the right side of FIG. 7A, the memory device 700 further comprises sections 712, 714, 716, 718, 720, 722, 724 configured similarly to the section 702, and including banks 4~31 of the memory device 700 as well as corresponding first and second stage adders. Outputs of the second stage adders in the sections 702, 712 are coupled to inputs of third stage adders 732. Outputs of the second stage adders in the sections 714, 716 are coupled to inputs of third stage adders 734. Outputs of the second stage adders in the sections 718, 720 are coupled to inputs of third stage adders 736. Outputs of the second stage adders in the sections 722, 724 are coupled to inputs of third stage adders 738. Outputs of the third stage adders 732, 734 are coupled to inputs of fourth stage adders 740. Outputs of the third stage adders 736, 738 are coupled to inputs of fourth stage adders 742. Outputs of the fourth stage adders 740, 742 are coupled to inputs of fifth stage adders 744.

The sections 702, 712, 714, 716, 718, 720, 722, 724, the third stage adders 732, 734, 736, 738, the fourth stage adders 740, 742, and the fifth stage adders 744 together form a portion 745 of the memory device 700. The memory device 700 further comprises a portion 746 configured similarly to the portion 745. The portion 746 of the memory device 700 contains banks 32-63 with corresponding logic circuits and first through fifth stage adders. The memory device 700 further comprises a portion 747 including the sixth stage adder(s), bit shifter, accumulation circuit and write circuitry. In some embodiments, the memory device 700 operates in a manner similar to one or more of the memory devices 500A, 600. In at least one embodiment, one or more advantages described herein are achievable by the memory device 700.

Figure 7B:
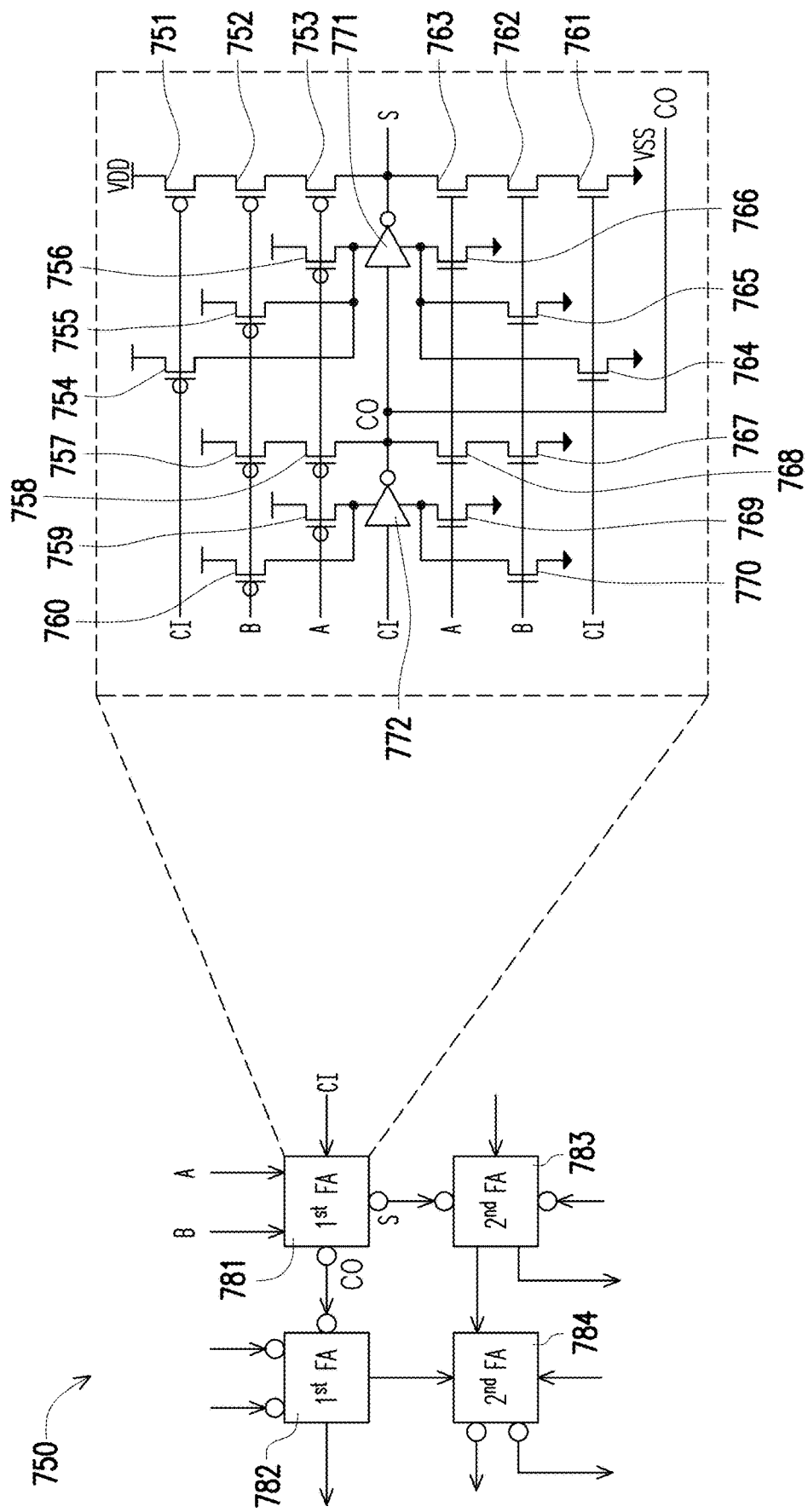
FIG. 7B is a schematic circuit diagram of a section of an adder tree in a memory device, in accordance with some embodiments.

FIG. 7B is a schematic circuit diagram of an FA cell 750 in the memory device 700, in accordance with some embodiments.

The FA cell 750 comprises first stage adders 781, 782, and second stage adders 783, 784. The first stage adders 781, 782, and second stage adders 783, 784 are similarly configured, except that the second stage adders 783, 784 correspond to polarity inversed circuits of the first stage adders 781, 782. A circuit diagram of the first stage adder 781 is described in detail herein.

The first stage adder 781 comprises PMOS transistors 751-760, NMOS transistors 761-770, and inverter 771, 772. The PMOS transistors 751-753 are coupled in series between a power supply voltage VDD and node S. The PMOS transistors 754-756 are coupled in parallel between VDD and an enabling terminal of the inverter 771. The PMOS transistors 757-758 are coupled in series between VDD and node CO. The PMOS transistors 759-760 are coupled in parallel between VDD and an enabling terminal of the inverter 772. Gates of the PMOS transistors 751, 754 are coupled together and to a node CI. Gates of the PMOS transistors 752, 755, 757, 760 are coupled together and to a node B. Gates of the PMOS transistors 753, 756, 758, 759 are coupled together and to a node A. The NMOS transistors 761-763 are coupled in series between a voltage VSS and node S. The NMOS transistors 764-766 are coupled in parallel between VSS and an enabling terminal of the inverter 771. The NMOS transistors 767-768 are coupled in series between VSS and node CO. The NMOS transistors 769-770 are coupled in parallel between VSS and an enabling terminal of the inverter 772. Gates of the NMOS transistors 761, 764 are coupled together and to a node CI. Gates of the NMOS transistors 762, 765, 767, 770 are coupled together and to a node B. Gates of the NMOS transistors 763, 766, 768, 769 are coupled together and to a node A. An input of the inverter 771 is coupled to node S. An output of the inverter 771 is coupled to node CO and to an output of the inverter 771. An input of the inverter 772 is coupled to node CI.

Figure 8:
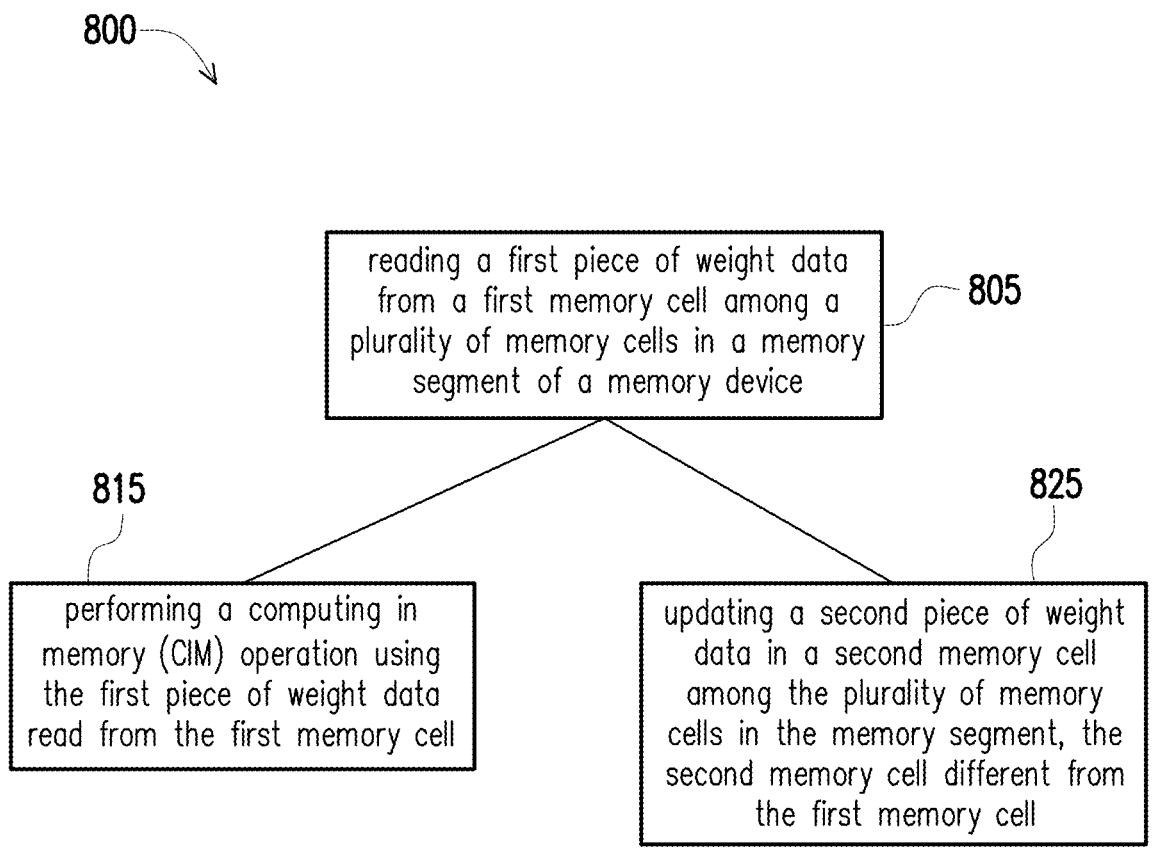
FIG. 8 is a flowchart of a method in accordance with some embodiments.

FIG. 8 is a flowchart of a method 800, in accordance with some embodiments. In at least one embodiment, the method 800 is performed in or by one or more ICs, memory devices, memory macros described with respect to FIGS. 1A-7B. The method 800 comprises operations 805, 815, 825, among which operations 815 and 825 are performed simultaneously.

At operation 805, a first piece of weight data is read from a first memory cell among a plurality of memory cells in a memory segment of a memory device. For example, as described with respect to one or more of FIGS. 4A, 4B, a pulse 422 is applied to a word line WL[0] corresponding to a first memory cell MC[0] to be read from, and a piece W[0] of weight data stored in the memory cell MC[0] is read out and placed on a bit line BL. In a similar manner in the memory device in FIG. 5A, a word line WL[0] is selected and a piece W[0] of weight data stored in the memory cell MC[0] is read out and placed on a read bit line RBLB.

At operation 815, a computing in memory (CIM) operation is performed using the first piece of weight data read from the first memory cell. For example, as described with respect to one or more of FIGS. 4A, 4B, a register 415 coupled to the bit line BL is controlled to latch the first piece W[0] of weight data read from the memory cell MC[0] at a first input of a logic circuit 416. Input data IN are supplied to a second input of the logic circuit 416. The logic circuit 416 and a MAC circuit 417 perform a CIM operation, e.g., a multiplication, of the latched piece W[0] of weight data and the input data IN. For another example, as described with respect to FIG. 5A, the memory cells in the memory segment being accessed are multi-port memory cells which permit the piece W[0] of weight data read from the memory cell MC[0] to be maintained on a read bit line RBLB without being affected by other activities, such as weight data updating over another write bit line WBLB. The piece W[0] of weight data read from the memory cell MC[0] and the input data IN are used in a CIM operation in manner similar to that described with respect to FIG. 4A, 4B.

At least partially simultaneously with operation 815, operation 825 is performed to updating a second piece of weight data in a second memory cell different from the first memory cell. For example, as described with respect to one or more of FIGS. 4A, 4B, while a CIM operation is being performed using the piece W[0] of weight data read from the memory cell MC[0] and input data IN, one of the memory cells MC[1]~MC[N] is accessed in a write operation by a pulse 428 on the corresponding word line WL[1]~WL[N], and a corresponding new piece of weight data Wn[1]~Wn[N] is supplied from a weight buffer 414 to the bit line BL and is written, or updated, in the accessed memory cell among the memory cells MC[1]~MC[N]. In at least one embodiment, the described weight data updating is performed for more than one memory cell during the CIM operation using the weight data read from the memory cell MC[0]. For another example, as described with respect to FIG. 5A, weight data updating is performed for another memory cell, e.g., the memory cell MC[N], to write new weight data via the write bit line WBLB to the memory cell MC[N] while the CIM operation is being performed using the weight data W[0] read from the memory cell MC[0] over another bit line, i.e., read bit line RBLB. As a result, it is possible to simultaneously perform CIM operations and weight data updating in a memory segment of multi-port memory cells without a register coupled to a bit line of the memory segment. In some embodiments, a register is nevertheless coupled to a read bit line RBLB of a memory segment of multi-port memory cells, to maintain the read-out weight data over an extended period to ensure proper execution of the CIM operation. In at least one embodiment, one or more advantages described herein are achievable by the method 800.

The described methods and algorithms include example operations, but they are not necessarily required to be performed in the order shown. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure.

In some embodiments, a memory device comprises a memory array comprising at least one memory segment configured to store weight data, at least one weight buffer coupled to the at least one memory segment and configured to hold new weight data to be updated in the at least one memory segment, at least one logic circuit, and a computation circuit coupled to an output of the logic circuit. The logic circuit further has a first input coupled to the at least one memory segment by at least one bit line, and a second input configured to receive input data. The logic circuit is configured to generate, at the output, intermediate data corresponding to the input data and the weight data read from the at least one memory segment through the at least one bit line. The computation circuit is configured to, based on the intermediate data, generate output data corresponding to a computation performed on the input data and the weight data read from the at least one memory segment.

In some embodiments, a method comprises simultaneously performing a computing-in-memory (CIM) operation using a first piece of weight data read from a first memory cell among a plurality of memory cells in a memory segment of the memory device, and updating a second piece of weight data in a second memory cell among the plurality of memory cells in the memory segment, the second memory cell different from the first memory cell.

In some embodiments, a memory device comprises a memory array, an input driver, and a Multiply Accumulate (MAC) circuit. The memory array comprises a plurality of memory segments configured to store weight data for a computing-in-memory (CIM) operation, a plurality of write bit lines coupled to the plurality of memory segments to update the weight data stored in the plurality of memory segments, and a plurality of read bit lines coupled to the plurality of memory segments to read out the weight data stored in the plurality of memory segments for the CIM operation. The input driver is coupled to a plurality of input data lines, and configured to supply input data over the plurality of input data lines. The MAC circuit coupled to the plurality of read bit lines and the plurality of input data lines, and configured to perform the CIM operation based on the weight data read out from the plurality of memory segments and the input data supplied from the input driver.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A memory device, comprising:
a memory array comprising at least one memory segment configured to store weight data;
at least one weight buffer coupled to the at least one memory segment, and configured to hold new weight data to be updated in the at least one memory segment;
at least one logic circuit having
a first input coupled to the at least one memory segment by at least one bit line,
a second input configured to receive input data, and
an output; and
a computation circuit coupled to the output of the at least one logic circuit,
wherein
the at least one logic circuit is configured to generate, at the output, intermediate data corresponding to the input data and the weight data read from the at least one memory segment through the at least one bit line, and
the computation circuit is configured to, based on the intermediate data, generate output data corresponding to a computation performed on the input data and the weight data read from the at least one memory segment.

2. The memory device of claim 1, wherein
the memory array, the at least one weight buffer, the at least one logic circuit and the computation circuit are included in a same memory macro.

3. The memory device of claim 1, wherein
the at least one logic circuit comprises a NOR gate or an AND gate.

4. The memory device of claim 1, wherein
the computation circuit comprises a Multiply Accumulate (MAC) circuit.

5. The memory device of claim 4, wherein
the MAC circuit comprises an adder tree having a plurality of adder stages.

6. The memory device of claim 1, further comprising:
at least one register coupled to the at least one bit line, between the at least one memory segment and the first input of the at least one logic circuit.

7. The memory device of claim 6, wherein
the at least one memory segment comprises single-port memory cells coupled to the at least one bit line.

8. The memory device of claim 1, wherein
the at least one memory segment comprises a plurality of memory cells each having
a storage circuit configured to store a corresponding piece of the weight data, and
an output buffer coupled between the storage circuit and the at least one bit line.

9. The memory device of claim 8, wherein
the output buffer comprises an inverter and a transmission gate,
the inverter is coupled between the storage circuit and the transmission gate, and
the transmission gate is coupled between the inverter and the at least one bit line.

10. The memory device of claim 8, wherein
the at least one bit line comprises a first bit line and a second bit line,
each of the plurality of memory cells is a multiport memory cell having
a first read port coupled to the first bit line, and
a second read port coupled to the second bit line, and
the at least one logic circuit comprises
a first logic circuit having a first input coupled to the first bit line, and a second input configured to receive a first part of the input data, and
a second logic circuit having a first input coupled to the second bit line, and a second input configured to receive a second part of the input data.

11. The memory device of claim 10, further comprising:
a first register coupled to the first bit line, between the at least one memory segment and the first logic circuit; and
a second register coupled to the second bit line, between the at least one memory segment and the second logic circuit.

12. A memory device comprising:
a memory segment;
a weight buffer coupled to the memory segment;
a logic circuit coupled to the memory segment and configured to generate intermediate data corresponding to input data and weight data read from the memory segment; and
a computation circuit coupled to the logic circuit and configured to, based on the intermediate data, generate output data corresponding to a computing-in-memory (CIM) operation using a first piece of weight data read from a first memory cell among a plurality of memory cells in the memory segment,
wherein the weight buffer is configured to, simultaneously with the CIM operation, update a second piece of weight data in a second memory cell among the plurality of memory cells in the memory segment, the second memory cell different from the first memory cell.

13. The memory device of claim 12, wherein
the weight buffer is configured to, simultaneously with the CIM operation using the first piece of weight data read from the first memory cell,
update the first piece of weight data in the first memory cell with a new first piece of weight data.

14. The memory device of claim 13, wherein
the weight buffer is configured to update the first piece of weight data in the first memory cell and the second piece of weight data in the second memory cell by providing the new first piece of weight data and a new second piece of weight data to the memory segment.

15. The memory device of claim 12, wherein
the weight buffer is configured to, simultaneously with the CIM operation using the first piece of weight data read from the first memory cell,
update at least one third piece of weight data in at least one third memory cell among the plurality of memory cells in the memory segment, the at least one third memory cell different from the first memory cell and the second memory cell.

16. The memory device of claim 12, further comprising:
a register configured to latch the first piece of weight data read from the first memory cell at an output of a register,
wherein the logic circuit is configured to generate the intermediate data corresponding to the input data and the latched first piece of weight data at the output of the register.

17. The memory device of claim 16, wherein
the plurality of memory cells in the memory segment comprises single-port memory cells coupled to a same bit line, and
the bit line is coupled to an input of the register.

18. The memory device of claim 12, wherein
the logic circuit is configured to perform a multiplication of the first piece of weight data with the input data, and
the computation circuit comprises an adder tree configured to receive a result of the multiplication.

19. A memory device, comprising:
at least one memory segment;
a weight buffer coupled to the at least one memory segment;
a register having
   an input coupled to the at least one memory segment, and
   an output;
a logic circuit having
   a first input coupled to the output of the register,
   a second input configured to receive input data, and
   an output; and
a computation circuit coupled to the output of the logic circuit,
wherein the logic circuit and the computation circuit are configured to perform a computing-in-memory (CIM) operation based on
   the input data, and
   weight data read out from the at least one memory segment and latched by the register.

20. The memory device of claim 19, wherein
the at least one memory segment comprises a plurality of memory segments, and
the weight buffer is configured to provide new weight data to a memory segment among the plurality of memory segments while a further memory segment among the plurality of memory segments is being read to supply the corresponding weight data stored in the further memory segment for the CIM operation.

\* \* \* \* \*